US 012313276B2

(12) United States Patent
Nabi et al.

(10) Patent No.: US 12,313,276 B2
(45) Date of Patent: *May 27, 2025

(54) TIME-VARYING REINFORCEMENT LEARNING FOR ROBUST ADAPTIVE ESTIMATOR DESIGN WITH APPLICATION TO HVAC FLOW CONTROL

(71) Applicant: Mitsubishi Electric Research Laboratories, Inc., Cambridge, MA (US)

(72) Inventors: Saleh Nabi, Wilmington, MA (US); Mouhacine Benosman, Boston, MA (US); Saviz Mowlavi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 440 days.

This patent is subject to a terminal disclaimer.

(21) Appl. No.: 17/660,046

(22) Filed: Apr. 21, 2022

(65) Prior Publication Data

US 2023/0341141 A1 Oct. 26, 2023

(51) Int. Cl.
*F24F 11/63* (2018.01)
*G05B 13/02* (2006.01)
*G05B 13/04* (2006.01)
*G06N 20/00* (2019.01)

(52) U.S. Cl.
CPC .......... *F24F 11/63* (2018.01); *G05B 13/0265* (2013.01); *G05B 13/048* (2013.01); *G06N 20/00* (2019.01)

(58) Field of Classification Search
CPC ... G06N 20/00; G05B 13/0265; G05B 13/048
USPC ........................................................... 700/44
See application file for complete search history.

(56) References Cited

U.S. PATENT DOCUMENTS

| | | |
|---|---|---|
| 2018/0100662 A1* | 4/2018 | Farahmand ........ G05B 19/0428 |
| 2021/0018209 A1* | 1/2021 | Ellis ..................... G05B 13/041 |
| 2021/0190364 A1* | 6/2021 | Lee ...................... G05B 13/027 |
| 2021/0191342 A1* | 6/2021 | Lee .......................... G06N 3/044 |
| 2023/0019836 A1* | 1/2023 | Camilus .................. G06F 9/451 |
| 2023/0168649 A1* | 6/2023 | Huber ...................... G06N 7/01 |
| | | 700/28 |

* cited by examiner

*Primary Examiner* — Md Azad
(74) *Attorney, Agent, or Firm* — Gene Vinokur

(57) ABSTRACT

A computer-implemented method using a reinforcement learning trained reduced order estimator (RL-trained ROE) and a closure model is provided for controlling a heating, ventilation, and air conditioning (HVAC) system including actuators. The method uses a processor coupled with a memory storing instructions implementing the method, wherein the instructions, when executed by the processor, carry out at steps of the method, includes acquiring setpoints of the HVAC system from a user input and measurement data from sensors arranged in the HVAC system, computing a high-dimensional state estimate using the measurement data and an estimate of reduced-order state from the RL-trained ROE, determining a controller with respect to the setpoints by using the RL-trained ROE, generating control commands based on the controller, and transmitting the control commands to the actuators of HVAC system via an output interface.

16 Claims, 15 Drawing Sheets

TIME-VARYING REINFORCEMENT LEARNING FOR ROBUST ADAPTIVE ESTIMATOR DESIGN WITH APPLICATION TO HVAC FLOW CONTROL

TECHNICAL FIELD

The invention relates generally to system modeling, prediction and control. More particularly to methods and apparatus for robust data-driven model adaptation with dynamic mode decomposition to control a HVAC unit.

BACKGROUND

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

For example, optimization-based control and estimation techniques, such as model predictive control (MPC), allow a model-based design framework in which the system dynamics and constraints can directly be taken into account. The MPC is used in many applications to control the dynamical systems of various complexities. Examples of such systems include production lines, car engines, robots, numerically controlled machining, motors, satellites and power generators. As used herein, a model of dynamics of a system or a model of a system describes dynamics of the system using differential equations. For example, the most general model of a linear system with p inputs u, q outputs y and n state variables x is written in the following form:

$$\dot{x}(t) = A(t)x(t) + B(t)u(t)$$

$$y(t) = C(t)x(t) + D(t)u(t).$$

However, in a number of situations, a model of the controlled system is nonlinear and can be difficult to design, to use in real-time, or can be inaccurate. Examples of such cases are prevalent in robotics, building control (HVAC), smart grids, factory automation, transportation, self-tuning machines, and traffic networks. In addition, even if the nonlinear model is exactly available, designing an optimal controller is essentially a challenging task since a partial differential equation, named Hamilton-Jacobi-Bellman (HJB) equation, needs to be solved.

In absence of accurate models of the dynamical systems, some control methods exploit operational data generated by dynamical systems in order to construct feedback control policies that stabilize the system dynamics, or embed quantifiable control-relevant performance. The use of operational data to design the control policies is called data-driven control. There are two kinds of data-driven control methods: (i) indirect methods that first construct a model of the system and then leverage the model to design controllers, and (ii) direct methods that directly construct control policies from the data without the intermediate model-building step.

A drawback of indirect methods is potential requirement of large quantities of data in the model-building phase. In addition, in the indirect control methods, the controller is computed from the estimated model, e.g., according to the certainty equivalence principle, but in practice the models estimated from the data do not capture the physics of dynamics of the system. Hence, a number of model based control techniques cannot be used with such data-driven models.

To overcome this problem, some methods use the direct methods of control to map the experimental data directly onto the controller, without any model to be identified in between. However, the direct methods of control results in a black box design of a control policy that maps a state of the system directly to control commands. However, such a control policy is not designed in consideration of the physics of the system. In addition, a control designer is not able to influence the data-driven determination of the control policy.

Therefore, there is still a need for a method and an apparatus for controlling the system in an optimum manner.

SUMMARY

It is an object of some embodiments to provide an apparatus and a method for data-driven design of a model of dynamics of a system to generate a model of dynamics of a system that capture physics of behavior of the system. In such a manner, the embodiments simplify model design process, while retaining advantages of having a model of the system in designing control applications. However, current data-driven methods are not suitable for estimating the model of the system that captures the physical dynamics of the system.

For example, reinforcement learning (RL) is an area of machine learning concerned with how to take actions in an environment so as to maximize some notion of cumulative reward (or equivalently, minimize a cumulative loss/cost). The reinforcement learning is related with optimal control in continuous state-input spaces, which is concerned mostly with existence and characterization of optimal control policies, and algorithms for their computation in the absence of a mathematical model of the controlled system and/or environment.

In view of the advantages offered by the RL methods, some embodiments aim to develop RL techniques that result in optimal control policies for dynamical systems that can be described with differential equations. However, a control policy maps the state of the system to a control command and does not or at least does not have to perform this mapping based on the physical dynamics of the system. Hence, the RL-based data-driven estimation of a model, with physical meaning, having one or multiple differential equations to describe the dynamics of the system is unexplored by the control community.

Some embodiments are based on realization that RL data-driven learning of the model of dynamics of the system, with physical meaning, can be seen as a virtual control problem where a reward function is a minimization of a difference between behavior of the system according to the learned model and the actual behavior of the system. Notably, the behavior of the system is a high level characterization of the system, e.g., stability of the system, boundedness of the states. Indeed, a system has behavior even in uncontrolled situations. Unfortunately, an estimation of such a model through RL is computationally challenging.

To that end, some embodiments are based on the recognition that a model of a system can be represented with a reduced order model combined with a virtual control term, we call a closure model. For example, if the full physic-based model of the system is typically captured by a partial differential equation (PDE), the reduced order model can be represented by an ordinary differential equation (ODE). The ODE represents dynamics of the system as a function of time, but less accurately than the representation of dynamics using PDE. Hence, the objective of closure model is to reduce this gap.

As used herein, a closure model is a nonlinear function of a state of a system capturing a difference in behavior of the system estimated by the ODE and the PDE. Hence, the closure model is also a function of time representing a difference of dynamics between dynamics captured by the ODE and the PDE. Some embodiments are based on understanding that representation of dynamics of the system as a combination of the ODE and the closure model can simplify subsequent control of the system, because solving the PDE equations is computationally expensive. Therefore, some embodiments are trying to simplify the data-driven estimation of dynamics of the system by representing the dynamics with the ODE and the closure model and updating only the closure model. However, this problem, while computationally simpler, is also challenging when formulated in a framework of the RL. This is because usually the RL is used to learn a control policy to control the system precisely. Here, in this analogy, the RL should try to estimate the closure model precisely, which is challenging.

However, some embodiments are based on the realization that in a number of modelling situations it is sufficient to represent a pattern of behavior of the dynamics of the system, and not the exact behavior itself. For example, when the exact behavior capture energy of the system at each point of time, the pattern of the behavior captures rate of change of the energy. As an analogy, when the system is excited the energy of the system increases. Knowing the exact behavior of the dynamics of the system allows to evaluate such an energy increase. Knowing the pattern of the behavior of the dynamics of the system allows to evaluate a rate of increase to estimate a new value of the energy proportional to its actual value.

Thus, the pattern of the behavior of the dynamics of the system is not the exact behavior itself, however, in a number of model-based control applications, the pattern of the behavior of the dynamics of the system is sufficient to design Lyapunov stable control. Examples of such control applications include stabilization control aiming to stabilize a state of the system.

To that end, some embodiments use RL to update the closure model such that dynamics of the ODE and the updated closure model mimics the pattern of dynamics of the system. Some embodiments are based on realization that the pattern of dynamics can be represented by a shape of state trajectory determined as a function of time, as contrasted with values of the state of the system. The state trajectory can be measured during online functioning of the system. Additionally, or alternatively, the state trajectory can be simulated using the PDE.

To that end, some embodiments control the system using a model of the system including a combination of ODE and a closure model and update the closure model with RL having a value function reducing the difference between an actual shape of the state trajectory and a shape of state trajectory estimated using ODE with the updated closure model.

However, after convergence, the ODE with updated closure model represents the pattern of the dynamics of the behavior of the system but not the actual values of the behavior. In other words, the ODE with updated closure model is a function proportional to actual physical dynamics of the system. To that end, some embodiments include a gain in the closure model that is later learned during online control of the system with methods more suitable to model based optimization than RL. Examples of these methods are extremum seeking, Gaussian processes-based optimization, etc.

Additionally, or alternatively, some embodiments use a model of the system determined by the data-driven adaptation in various model based predictive controls, e.g., MPC. These embodiments allow to take advantage from ability of the MPC to consider constraints in control of the system. For example, classic RL methods are not suitable for data-driven control of constrained systems. This is because the classic RL methods do not consider state and input constraint satisfaction in continuous state-action spaces; that is, the classic RL cannot guarantee that the states of the controlled system operated with control inputs satisfy state and input constraints throughout the operation.

However, some embodiments use RL to learn the physics of the system allowing to combine the data-driven advantages of RL with model based constrained optimization.

Accordingly, one embodiment discloses an apparatus for controlling an operation of the system. The apparatus comprises an input interface configured to receive a state trajectory of the system; a memory configured to store a model of dynamics of the system including a combination of at least one differential equation and a closure model; a processor configured to: update the closure model using reinforcement learning (RL) having a value function reducing a difference between a shape of the received state trajectory and a shape of state trajectory estimated using the model with the updated closure model; and determine a control command based on the model with the updated closure model; and an output interface configured to transmit the control command to an actuator of the system to control the operation of the system.

Another embodiment discloses a method for controlling an operation of the system. The method uses a processor coupled to memory storing a model of dynamics of the system including a combination of at least one differential equation and a closure model, the processor is coupled with stored instructions when executed by the processor carry out steps of the method, comprising: receiving a state trajectory of the system; updating the closure model using reinforcement learning (RL) having a value function reducing a difference between a shape of the received state trajectory and a shape of state trajectory estimated using the model with the updated closure model; determining a control command based on the model with the updated closure model; and transmitting the control command to an actuator of the system to control the operation of the system.

According to some embodiments of the present invention, a computer-implemented method using a reinforcement learning trained reduced order estimator (RL-trained ROE) and a robust closure model is provided for controlling a heating, ventilation, and air conditioning (HVAC) system including actuators. The method uses a processor coupled with a memory storing instructions implementing the method, wherein the instructions, when executed by the processor, carry out at steps of the method, include acquiring, via an input interface, setpoints of the HVAC system from a user input and measurement data from sensors arranged in the HVAC system; computing a high-dimensional state estimate using the measurement data and an estimate of reduced-order state from the RL-trained ROE; determining a controller with respect to the setpoints by using the RL-trained ROE; generating control commands based on the controller; and transmitting the control commands to the actuators of HVAC system via an output interface.

Further, some embodiments of the present invention provide an apparatus for controlling a heating, ventilation, and air conditioning (HVAC) system including actuators. The apparatus may include an input interface configured to acquire setpoints of the HVAC system from a user input and measurement data from sensors arranged in the HVAC system; at least one memory configured to store instructions implementing a computer-implemented method; and at least one processor coupled with the at least one memory, wherein the instructions, when executed by the at least one processor, carry out at steps of the computer-implemented method, including computing a high-dimensional state estimate using the measurement data and an estimate of reduced-order state from the RL-trained ROE; determining a controller with respect to the setpoints by using the RL-trained ROE; and generating control commands based on the controller; and an output interrace configured to transmit the control commands including control instructions that control the actuators operating the HVAC system.

BRIEF DESCRIPTION OF THE DRAWINGS

The accompanying drawings, which are included to provide a further understanding of the invention, illustrate embodiments of the invention and together with the description to explain the principle of the invention. The drawings shown are not necessarily to scale, with emphasis instead generally being placed upon illustrating the principles of the presently disclosed embodiments.

Figure 1:
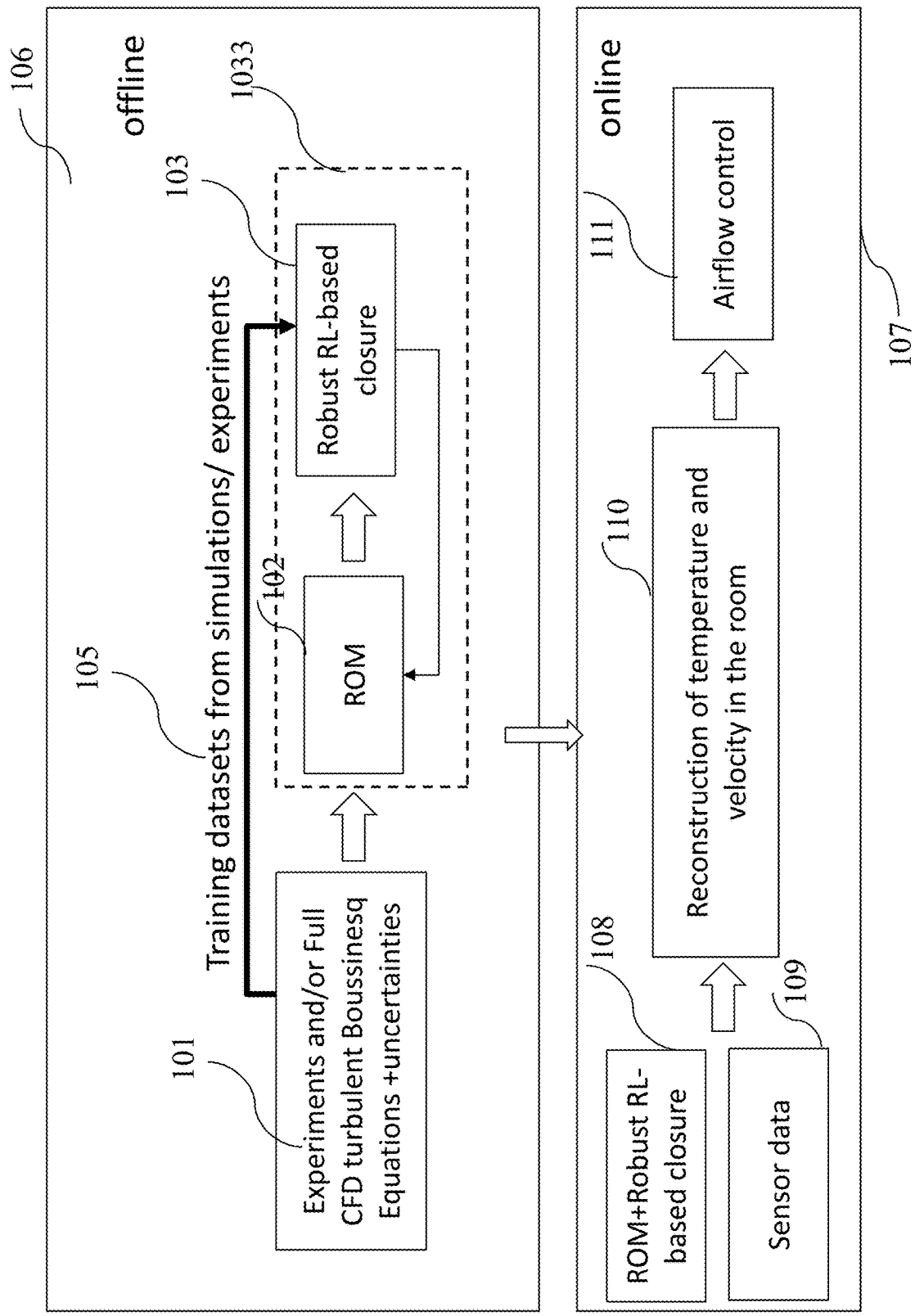
FIG. 1 shows a block diagram of two stages to generate a robust reduced order model in an offline fashion to be used in online control, according to an embodiment of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

In describing embodiments of the invention, the following definitions are applicable throughout the present disclosure.

A "control system" or a "controller" may be referred to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

An "air-conditioning system" or a heating, ventilating, and air-conditioning (HVAC) system may be referred to a system that uses the vapor compression cycle to move refrigerant through components of the system based on principles of thermodynamics, fluid mechanics, and/or heat transfer. The air-conditioning systems span a very broad set of systems, ranging from systems which supply only outdoor air to the occupants of a building, to systems which only control the temperature of a building, to systems which control the temperature and humidity.

A "central processing unit (CPU)" or a "processor" may be referred to a computer or a component of a computer that reads and executes software instructions. Further, a processor can be "at least one processor" or "one or more than one processor".

FIG. 1 shows the block diagram of the schematic of how the control and estimation of large-scale systems, such as the ones that arise after discretization of partial differential equations (PDEs) can be done using a two-stage apparatus.

In stage 1, denoted by 106, an offline task is carried out to derive a robust reduced order model (ROM). The data for development of such models may be generated by high fidelity computational fluid dynamics (CFD) simulation or by doing experiments.

CFD is a branch of fluid mechanics that uses numerical analysis and data structures to analyze and solve problems that involve fluid flows. Computers are used to perform the calculations required to simulate the free-stream flow of the fluid, and the interaction of the fluid (liquids and gases) with surfaces defined by boundary conditions. Ongoing research has led to software that improves the accuracy and speed of complex simulation scenarios such as transonic or turbulent flows or the ones that arise in HVAC applications to describe the airflow. Initial validation of such software is typically performed using experimental apparatus such as wind tunnels. In addition, previously performed analytical or empirical analysis of a particular problem can be used for comparison.

The datasets generated by either CFD simulation or experiments are then used to develop a ROM, which may be only valid for that trajectory obtained by CFD. For instance, CFD of step 101 can be done for a room where the window is closed, and ROM 102 is only valid for this condition. When the window is opened the accuracy of ROM 102 deteriorates and may become unstable or very inaccurate. In this case, several trajectories generated by CFD simulations or experiments of 101 are used to train 1033 to be used for estimation and control. All such tasks are carried out offline. Model 1033 (102 plus103) generated by offline stage 106, trained based on the difference between the prediction of the RL-corrected ROM 102 and the training data 105, is a model which is robust to parameter variation and can also handle unknown initial conditions.

The uncertainty in 102 due to uncertainties in experiments or CFD simulations 101, can be addressed by the development of robust ROMs in 103.

A big challenge is that ROMs provide a simplified and imperfect description of the dynamics, which negatively affects the performance of the state estimator to be used for online control. One potential solution is to improve the accuracy of the ROM itself through the inclusion of additional closure terms with more details in FIG. 5.

Some embodiments strive to develop more robust ROMs by various methods, e.g., using various trajectories and averaging, using sensitivity analysis, using a-priori known basis functions specific to the problem, etc.

Some embodiments, develop ROMs based on only given trajectories and instead of further development of ROM, propose an extra term called closure model to increase the accuracy of estimation. For instance, Lyapunov-based closure model, physics-inspired closure model (e.g., using artificial diffusion), or reinforcement-learning methods can be used to develop models for closure term.

Some embodiments, use conventional methods such as Kalman filtering to add estimation layer to ROM. For statistics and control theory, Kalman filtering, also known as linear quadratic estimation (LQE), is an algorithm that uses a series of measurements observed over time, including statistical measurement and modelling noise, and produces estimates of unmeasured states of the system. These estimates are more accurate than those based on a single measurement alone, by estimating a joint probability distribution over the states for each timeframe.

Some embodiments use reinforcement-learning reduced-order estimator (RL-ROE), which in turn can be used for online control. The RL-ROE is constructed from the ROM in an analogous way to a Kalman filter, with the crucial difference that the linear filter gain function is replaced by a nonlinear stochastic policy trained through reinforcement learning (RL). The flexibility of the nonlinear policy enables the RL-ROE to compensate for errors of the ROM, due for example to the imperfect knowledge of the dynamics.

Some embodiments describe the estimation problem as a stationary Markov decision process (MDP) in order to enable the RL training using RL methods for stationary MDPs. A Markov process is a random process in which the future is independent of the past, given the present. Thus, Markov processes are the natural stochastic analogs of the deterministic processes described by differential and difference equations. They form one of the most important classes of random processes.

Some embodiments show that the trained RL-ROE is able to outperform a Kalman filter designed using the same ROM and displays robust estimation performance with respect to different reference trajectories and initial state estimates. The proposed RL-ROE is the first application of reinforcement learning to state estimation for high-dimensional systems. More details on this will be given for FIGS. 6 and 8.

Once the ROM and the closure model are constructed, the resulting model can be used first for estimation and ultimately for online control. For example, the robust model 108, which is generated using several CFD or experimental trajectories 101, may have been developed by using several conditions on windows (e.g., open, close, half open) or given number of occupants, for a specific room layout (e.g., rectangular, L-shaped). But in practice, the number of people in the room maybe varying and the window may be one-quarter open for a layout that is neither rectangular nor L-shaped, but a combination between the two. The closure model learned in the offline stage 106 is configured to estimate the room conditions, e.g., temperature or velocity in the room, even for such unseen cases that fall within similar trajectories generated by 101. This can be done if the sensor data 109, which represents a partial exact knowledge of the physics of the room and the HVAC installed within, are being fed into 108. Such process is also known as data assimilation, i.e., assimilating the exact information from sensing with the possibly inexact model information.

Data assimilation is a mathematical discipline that seeks to optimally combine predictions (usually in the form of a numerical model) with observations. There may be a number of different goals sought—for example, to determine the optimal state estimate of a system, to determine initial conditions for a numerical forecast model, to interpolate sparse observation data using knowledge of the system being observed, to identify numerical parameters of a model from observed experimental data. Depending on the goal, different solution methods may be used. Data assimilation is distinguished from other forms of machine learning, and statistical methods in that it utilizes a dynamical model of the system being analyzed. Process (process step) 110 of reconstruction of temperature and velocity in the room is the result of such data-assimilation of a robust model of 108 and sensor data of 109.

Offline and online stages 106 and 107 are examples of development of simplified and robust models 108, which in turn can be used for estimation and control.

Estimation theory is a branch of statistics that deals with estimating the values of parameters based on measured empirical data that has a random component. The parameters describe an underlying physical setting in such a way that their value affects the distribution of the measured data. An estimator attempts to approximate the unknown parameters using the measurements. In estimation theory, two approaches are generally considered: The probabilistic approach (described in this invention) assumes that the measured data is random with probability distribution dependent on the parameters of interest, and the set-membership approach which assumes that the measured data vector belongs to a set which depends on the parameter vector.

Example of sensory data, installed within the room for HVAC applications, are thermocouple reading, thermal camera measurements, velocity sensors, humidity sensors, etc.

Once the temperature or velocity within the room is reconstructed in 110, the online control stage 107 can be performed for airflow control 111 in the room. More details are given in FIG. 9.

Figure 2:
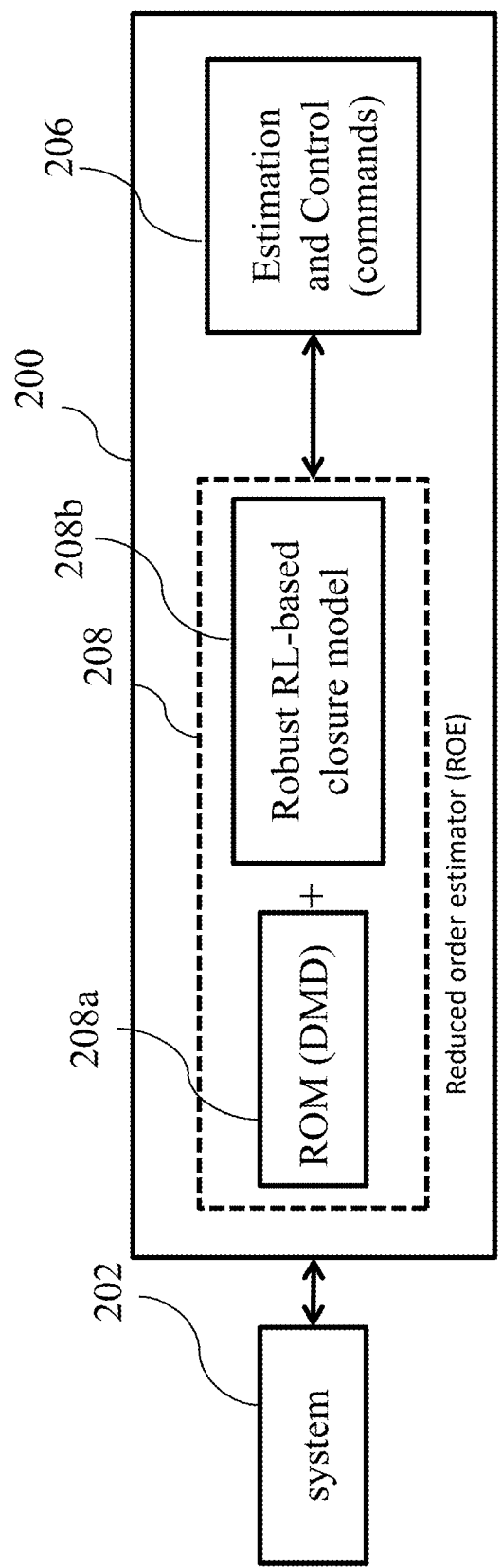
FIG. 2 shows a schematic overview of principles used by some embodiments for controlling an operation of a system.

FIG. 2 shows a schematic overview of principles used by some embodiments for controlling an operation of a system. Some embodiments provide a control apparatus 200 configured to control a system 202. For example, the apparatus 200 can be configured to control continuously operating dynamical system 202 in engineered processes and machines. Hereinafter, 'control apparatus' and 'apparatus' may be used interchangeable and would mean the same. Hereinafter, 'continuously operating dynamical system' and 'system' may be used interchangeably and would mean the same. Examples of the system 102 are HVAC systems, Light Detection and Ranging (LIDAR) systems, condensing units, production lines, self-tuning machines, smart grids, car engines, robots, numerically controlled machining, motors, satellites, power generators, traffic networks, and the like. Some embodiments are based on realization that the apparatus 200 develops control policies 206 configured to provide estimation and control (commands) for controlling the system 202 using control actions in an optimum manner without delay or overshoot and ensuring control stability.

In some embodiments, the apparatus 200 uses model-based and/or optimization-based control and estimation techniques, such as model predictive control (MPC), to develop the control commands 206 for the system 202. The model-based techniques can be advantageous for control of dynamic systems. For example, the MPC allows a model-based design framework in which the system 202 dynamics and constraints can directly be taken into account. The MPC develops the control commands 206, based on the model of the system 202. The model of the system 202 refers to dynamics of the system 202 described using differential equations. In some embodiments, the model is non-linear and can be difficult to design and/or difficult to use in real-time. For instance, even if the nonlinear model is exactly available, estimating the optimal control commands 206 are essentially a challenging task since a partial differential equation (PDE) describing the dynamics of the system 202, named Hamilton-Jacobi-Bellman (HJB) equation needs to be solved, which is computationally challenging.

Some embodiments use data-driven control techniques to design the model. The data-driven techniques exploit operational data generated by the system 202 in order to construct feedback control policy that stabilizes the system 202. For instance, each state of the system 202 measured during the operation of the system 202 may be given as the feedback to control the system 202. In general, the use of operational data to design the control policies and/or commands 206 is called data-driven control. The objective of data-driven control is to design a control policy from data and to use the data-driven control policy to control a system. In contrast with such data-driven control approaches, some embodiments use operational data to design a model, e.g., a model, of the control system and, then, to use the data-driven model to control the system 202 using various model-based control methods. It should be noted, that the objective of some embodiments is to determined actual model of the system 202 from data, i.e., such a model that can be used to estimate behavior of the system 202. For example, it is an object of some embodiments to determine the model of a system from data that capture dynamics of the system using differential equations. Additionally, or alternatively, it is an object of some embodiments to learn from data the model having physics-based PDE model accuracy.

To simplify the computation, some embodiments formulate an ordinary differential equation (ODE) 208a to describe the dynamics of the system 202. In some embodiments, the ODE 208a may be formulated using model reduction techniques. For example, the ODE 208a may be reduced dimensions of the PDE. To that end, the ODE 208a can be a part of the PDE. However, in some embodiments, the ODE 108a fails to reproduce actual dynamics (i.e. the dynamics described by the PDE) of the system 202, in cases of uncertainty conditions. Examples of the uncertainty conditions may be the case where boundary conditions of the PDE are changing over a time or the case where one of coefficients involved in the PDE are changing.

To that end, some embodiments provide a reduced order estimator (ROE) 208 that includes ROM (DMD) 208a and a robust RL-based closure model 208b that reduces the PDE, while covering the cases of the uncertainty conditions. In some embodiments, the closure model 208b may be a nonlinear function of a state of the system 202 capturing a difference in behavior (for instance, the dynamics) of the system 202 according to the ODE and the PDE. The closure model 208b may be formulated using reinforcement learning (RL). In other words, the PDE model of the system 202 is approximated by a combination of ODE (ROM) 208a and a closure model 208b, and the closure model 208b is learned from data using RL. In such a manner, the model approaching the accuracy of PDE is learned from data.

In some embodiments, the RL learns a state trajectory of the system 202 that defines the behavior of the system 202, rather than learning individual states of the system 202. The state trajectory may be a sequence of states of the system 202. Some embodiments are based on realization that a model 208 comprising the ODE 208a and the closure model 208b reproduces a pattern of the behavior of the system 202, rather the actual behavior values (for instance, the states) of the system 202. The pattern of the behavior of the system 202 may represent a shape of the state trajectory, for instance, a series of states of the system as a function of time. The pattern of the behavior of the system 202 may also represent a high-level characteristic of the model, for example boundedness of its solutions over time, or decay of its solutions over time, however, it does not optimally reproduce the dynamics of the system.

To that end, some embodiments determine a gain and include the gain in the closure model 208b to optimally reproduce the dynamics of the system 202. In some embodiments, the gain may be updated using optimization algorithms. The model 208 comprising the ODE 208a, the closure model 108b with the updated gain reproduces the dynamics of the system 202. Therefore, the model 208 optimally reproduces the dynamics of the system 202. Some embodiments are based on realization the model 208 comprises less number of parameters then the PDE. To that end, the model 208 is computationally less complex then the PDE that describes the physical model of the system 202. In some embodiments, the control polices 206 are determined using the model 208. The control policies 206 directly map the states of the system 202 to control commands to control the operations of the system 202. Therefore, the reduced model 108 is used to design control for the system 202 in efficient manner.

Figure 3:
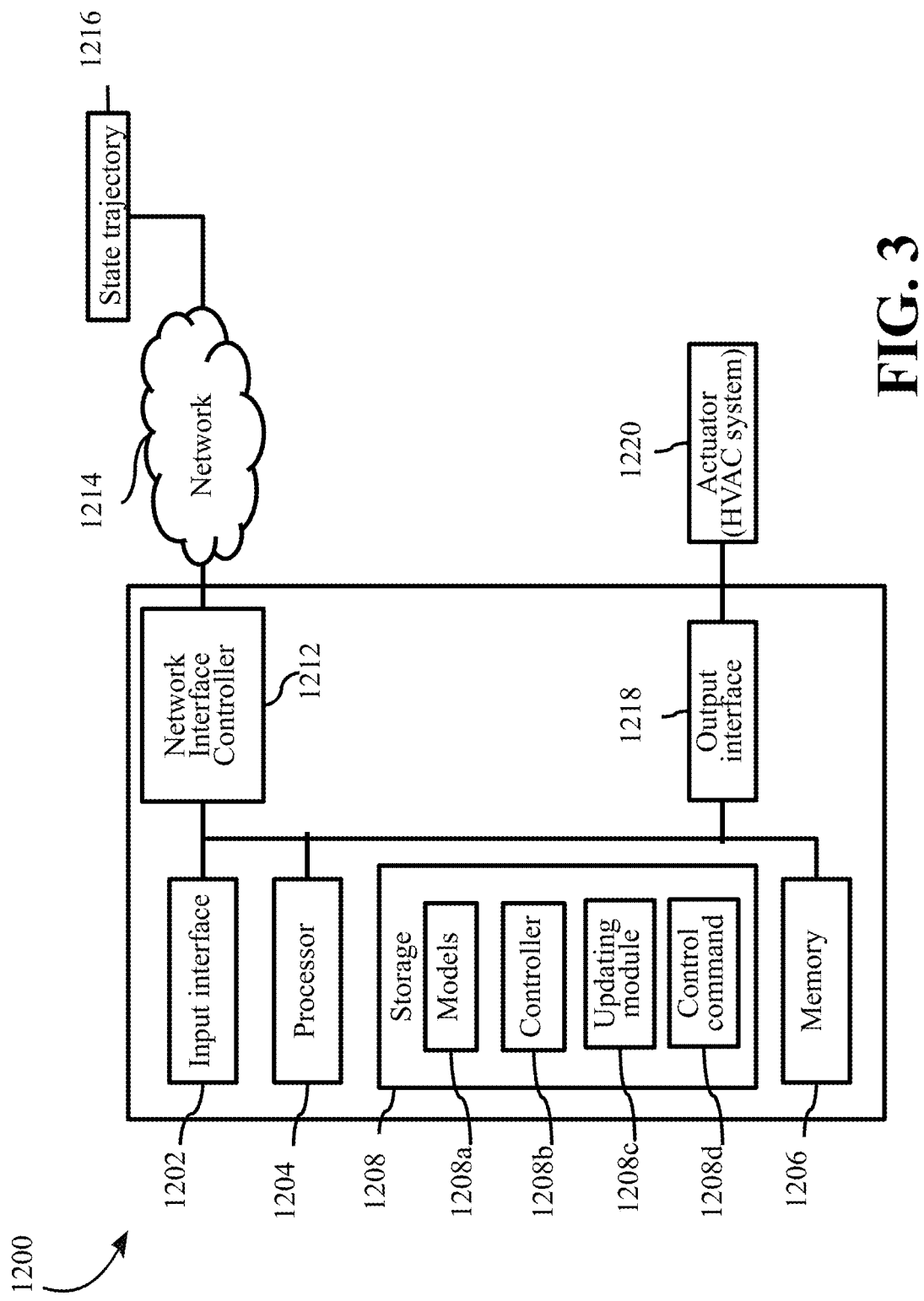
FIG. 3 shows a block diagram of an apparatus for controlling the operation of the system, according to some embodiments of the present invention.

FIG. 3 shows a block diagram of an apparatus 1200 for controlling an operation of the system 202, according to some embodiments. The apparatus 1200 includes an input interface 1202 and an output interface 1218 for connecting the apparatus 1200 with other systems and devices. In some embodiments, the apparatus 1200 may include a plurality of input interfaces and a plurality of output interfaces. The input interface 1202 is configured to receive a state trajectory 1216 of the system 202. The input interface 1202 includes a network interface controller (NIC) 1212 adapted to connect the apparatus 1200 through a bus 1210 to a network 1214. Through the network 1214, either wirelessly or through wires, the apparatus 1200 receives the state trajectory 1216 of the system 202.

The state trajectory 1216 may be a plurality of states of the system 202 that defines an actual behavior of dynamics of the system 202. For instance, the state trajectory 1216 acts as a reference continuous state space for controlling the system 202. In some embodiments, the state trajectory 1216 may be received from real-time measurements of parts of the system 202 states. In some other embodiments, the state trajectory 1216 may be simulated using the PDE that describes the dynamics of the system 202. In some embodiments, a shape may be determined for the received state trajectory as a function of time. The shape of the state trajectory may represent an actual pattern of behavior of the system 202.

The apparatus 1200 further includes a processor 1204 and a memory 1206 that stores instructions that are executable by the processor 1204. The processor 1204 may be a single core processor, a multi-core processor, a computing cluster, or any number of other configurations. The memory 1206 may include random access memory (RAM), read only memory (ROM), flash memory, or any other suitable memory system. The processor 1204 is connected through the bus 1210 to one or more input and output devices. The stored instructions implement a method for controlling the operations of the system 202.

The memory 1206 may be further extended to include storage 1208. The storage 1208 may be configured to store a model 1208a, a controller 1208b, an updating module 1208c, and a control command module 1208d. In some embodiments, the model 1208a may be the model describing the dynamics of the system 202, which includes a combination of at least one differential equation and a closure model. The differential equation of the model 1208 may be the ordinary differential equation (ODE) 208a. The closure model of model 208a may be a linear function or a nonlinear function of the state of the system 202. The closure model may be learnt using the RL to mimic the behavior of the system 202. As should be understood, once the closure model is learnt the closure model may be the closure 208b as illustrated in FIG. 1.

The controller 1208b may be configured to store instructions upon execution by the processor 1204 executes one or more modules in the storage 1208. Some embodiments are based on realization that the controller 1208b administrates each module of the storage 1208 to control the system 202.

The updating module 1208c may be configured to update the closure model of the model 1208a using the reinforcement learning (RL) having a value function reducing a difference between the shape of the received state trajectory and a shape of state trajectory estimated using the model 1208a with the updated closure model. In some embodiments, the updating module 1208c may be configured to update the closure module iteratively with the RL until a termination condition is met. The updated closure model is the nonlinear function of the state of the system capturing a difference in behavior of the system according to the ODE and the PDE.

Further, in some embodiments, the updating module 1208c may be configured to update a gain for the updated closure model. To that end, some embodiments determine the gain reducing an error between the state of the system 202 estimated with the model 1208a having the updated closure model with the updated gain and an actual state of the system. In some embodiments, the actual state of the system may be a measured state. In some other embodiments, the actual state of the system may be a state estimated with the PDE describing the dynamics of the system 202. In some embodiments, the updating module 1208c may update the gain using an extremum seeking. In some other embodiments, the updating module 1208c may update the gain using a Gaussian process-based optimization.

The control command module 1208c may be configured to determine a control command based on the model 1208a with the updated closure model. The control command may control the operation of the system. In some embodiments, the operation of the system may be subject to constraints. To that end, the control command module 1208c uses a predictive model-based control to determine the control command while enforcing constraints. The constraints include state constraints in continuous state space of the system 202 and control input constraints in continuous control input space of the system 202.

The output interface 1218 is configured to transmit the control command to an actuator(s) 1220 of the system 202 to control the operation of the system. Some examples of the output interface 1218 may include a control interface that submits the control command to control the system 202.

Figure 4:
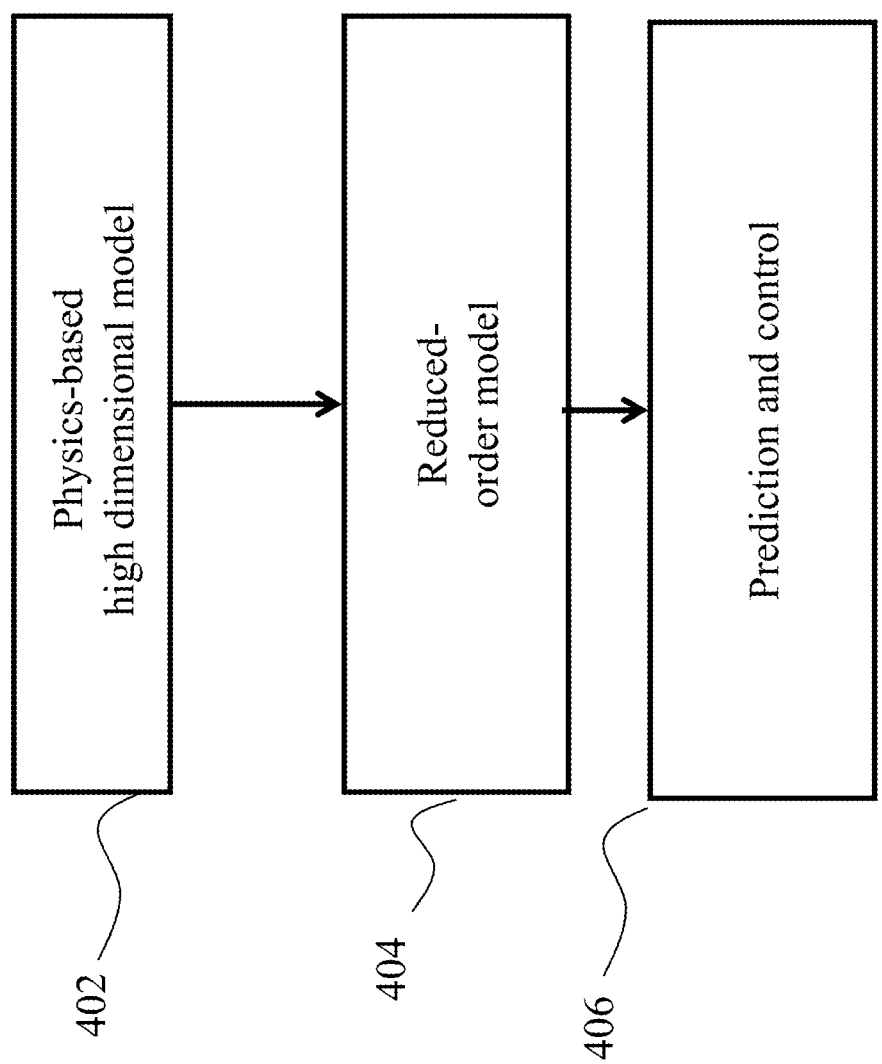
FIG. 4 shows a flowchart of principles for controlling the system, according to some embodiments of the present invention.

FIG. 4 shows a flowchart of principles for controlling the system 202, according to some embodiments. Some embodiments are based on realization that the system 202 can be modeled from physics laws. For instance, the dynamics of the system 202 can be represented by mathematical equations using the physics laws. At step 402, the system 202 may be represented by a physics-based high dimension model. The physics-based high dimension model may be the partial differential equation (PDE) describing the dynamics of the system 402. For the sake of explanation, the system 202 is considered to be the HVAC system, whose model is represented by Boussinesq equation. The Boussinesq equation is obtained from the physics, which describes a coupling between airflow and a temperature in a room. Accordingly, the HAVC system model can be mathematically represented as:

$$\vec{u}_t = \mu \Delta \vec{u} - (\vec{\mu} \cdot \nabla)\vec{u} - \nabla p - g\beta \Delta T$$

$$\nabla \cdot \vec{u} = 0$$

$$T_t = k\Delta T - u \cdot \nabla T$$

where T is a temperature scalar variable, $\vec{u}$ is a velocity vector in three dimensions, μ is a viscosity and the reciprocal of the Reynolds number, k is a heat diffusion coefficient, p is a pressure scalar variable, g is gravity acceleration, and β is the expansion coefficient. These set of equations are referred to as Navier-Stokes equation plus the conservation of energy. In some embodiments, such combination is known as Boussinesq equation. These equations are valid for cases where the variation of temperature or density of air compared to the absolute values of a reference point, e.g., temperature or density of air at the corner of the room, are negligible. Similar equations can be derived when such assumption is not valid, for which one needs to use compressible flow model. Moreover, the above equations are subjected to appropriate boundary conditions. For example, the velocity or temperature of HVAC unit can be considered as boundary condition.

The operator Δ and ∇ are defined in 3-dimensional room as:

$$\Delta = \nabla^2$$

$$\nabla = \left(\frac{\delta}{\delta x}, \frac{\delta}{\delta y}, \frac{\delta}{\delta z}\right)T$$

Some embodiments, refers to the governing equations in more abstract from of $$z_{k+1} = f(z_k),$$

$$y_k = C z_k,$$

where $z_k \in \mathbb{R}^n$ and $y_k \in \mathbb{R}^p$ are respectively the state and measurement at time k, f: $\mathbb{R}^n \to \mathbb{R}^n$ is a time-invariant nonlinear map from current to next state, and $C \in \mathbb{R}^{p \times n}$ is a linear map from state to measurement.

In some embodiments such abstract dynamics are obtained from the numerical discretization of a nonlinear partial differential equation (PDE), which typically requires a large number n of state dimensions.

Some embodiments are based on realization that the physics-based high dimension model of the system 202 needs to be resolved to control the operations of the system 202 in real-time. For instance, in the case of the HVAC system, the Boussinesq equation needs to be resolved to control the airflow dynamics and the temperature in the room. Some embodiments are based on recognition that the physics-based high dimension model of the system 202 comprises a large number of equations and variables, which are complicated to resolve. For instance, a larger computation power is required to resolve the physics-based high dimension model in real-time. To that end, it is objective of some embodiments to simplify the physics-based high dimension model.

At step 404, the apparatus 1200 is provided to generate a reduced order model to reproduce the dynamics of the system 202 such that the apparatus 1200 controls the system 202 in efficient manner. In some embodiments, the apparatus 1200 may simplify the physics-based high dimension model using model reduction techniques to generate the reduced order model. Some embodiments are based on realization that the model reduction techniques reduce the dimensionality of the physics-based high dimension model (for instance, the variables of the PDE), such that the reduced order model may be used to in real-time for prediction and control of the system 202. Further, the generation of reduced order model for controlling the system 202 is explained in detail with reference to FIG. 5. At step 406, the apparatus 1200 uses the reduced order model in real-time to predict and control the system 202.

Figure 5:
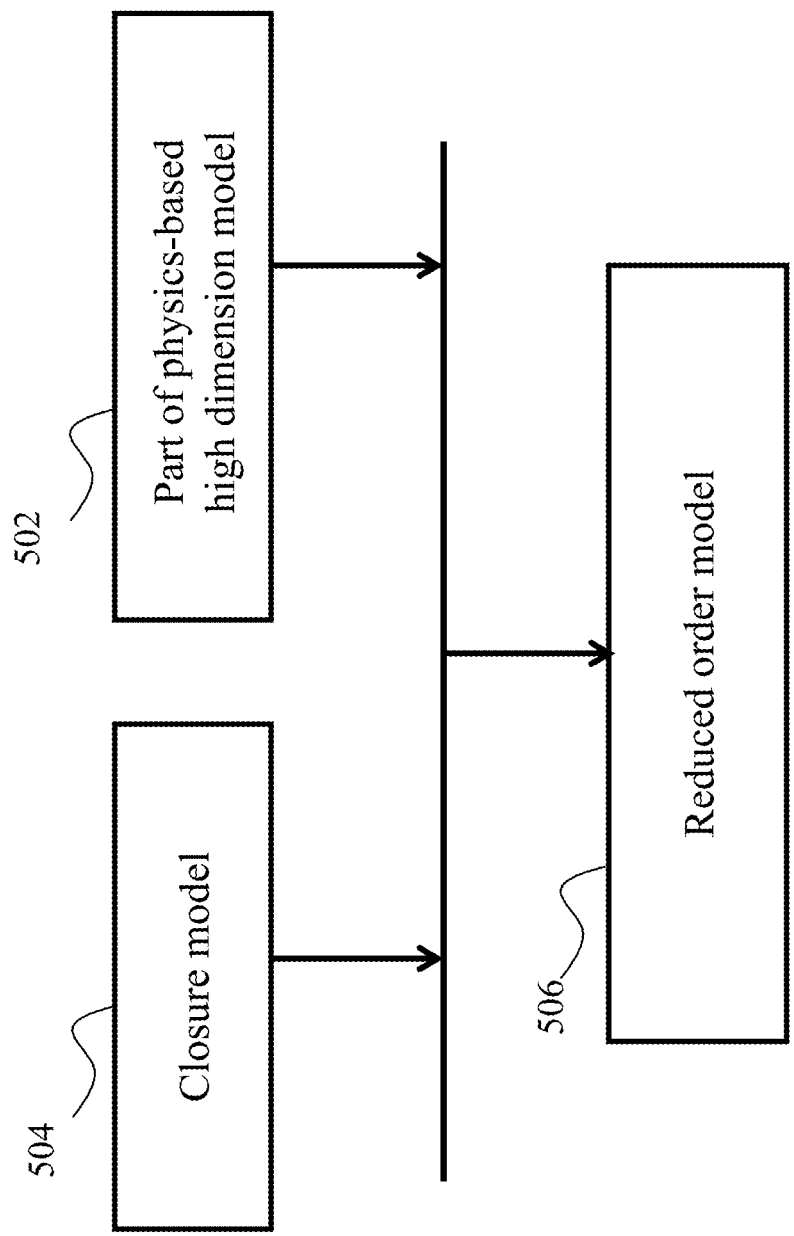
FIG. 5 shows a schematic architecture to generate a reduced order model, according to some embodiments of the present invention.

FIG. 5 shows a schematic architecture to generate the reduced order model, according to some embodiments. Some embodiments are based on realization that the apparatus 1200 use the model reduction techniques to generate a reduced order model (ROM) 506. The generated ROM 506, using the model reduction techniques, may be a part of the physics-based high dimension model 502. The part of the physics-based high dimension model 502 may be one or more differential equations describing the dynamics of the system 202. The part of the physics-based high dimension model 502 may be the ordinary differential equation (ODE). In some embodiments, the ODE fails to reproduce the actual dynamics (i.e. the dynamics described by the PDE), in the case of uncertainty conditions. Examples of the uncertainty conditions may be the case where the boundary conditions of the PDE are changing over the time or the case where one of the coefficients involved in the PDE are changing. These mathematical changes actually reflect some real changes in the actual dynamics. For example, in case of the HVAC system, an opening or closing of a window and/or a door in a room changes the boundary conditions of the Boussinesq equation (i.e. the PDE). Similarly, weather changes, such as daily and seasonal changes, affect the difference between a temperature in the room and outside of the room, which in turn affects some of the PDE coefficients, e.g. Reynold's number can be affected.

In all these scenarios, the model reduction techniques fail to have a unified approach to obtain the reduced order (or reduced dimension) model 506 of the dynamics of the system 202 covering all the above scenarios, i.e., parametric uncertainties as well as boundaries conditions uncertainties.

It is objective of some embodiments to generate the ROM 506 that reduces the PDE in the cases of changing boundary conditions and/or changing parameters. To that end, some embodiments use adaptive model reduction method, regimes detection method and the like.

For instance, one may choose a suitable linearly independent set of modes $\{u_1, \ldots, u_r\}$, where $u_i \in \mathbb{R}^n$, defining an r-dimensional subspace of $\mathbb{R}^n$ in which most of the dynamics is assumed to take place. Stacking these modes as columns of a matrix $U \in \mathbb{R}^{n \times r}$, one can then express $z_k \simeq U x_k$, where the reduced-order state $x_k \in \mathbb{R}^r$ represents the coordinates of $z_k$ in the subspace. Finally, one finds a ROM for the dynamics of $x_k$, which is vastly cheaper to evolve than the original full-order dynamics when r≪n.

There exist various ways to find an appropriate set of modes U and corresponding ROM for the dynamics of $x_k$. For instance, the Dynamic Mode Decomposition (DMD), is a purely data-driven algorithm that has found wide applications in fields ranging from fluid dynamics to neuroscience. Starting with a collection of snapshots $Z = \{z_0, \ldots, z_m\}$, the DMD seeks a best-fit linear model of the dynamics in the form of a matrix $A \in \mathbb{R}^{n \times n}$ such that $z_{k+1} \simeq Az_k$, and computes the modes U as the r leading principal component analysis (PCA) modes of Z. The transformation $z_k \simeq Ux_k$ and the orthogonality of U then yield a linear discrete-time ROM of the form $$z_{k+1} = A_r x_k + w_k,$$

$$y_k = C_r x_k + v_k,$$

where $A_r = U^T AU \in \mathbb{R}^{r \times r}$ and $C_r = CU \in \mathbb{R}^{p \times r}$ are the reduced-order state-transition and observation models, respectively.

In order to account for the neglected PCA modes of Z as well as the unmodeled dynamics incurred by the linear approximation $z_{k+1} \simeq Az_k$, some embodiments add (unknown) non-Gaussian process noise $w_k$ and observation noise $v_k$.

As another example, in one embodiment of the invention the reduced order 506 has the quadratic form:

$$\dot{x}_r = b + Ax_r + x_r^T Bx_r,$$

where b, A, B are constants related to the constants of the PDE equation and to the type of model reduction algorithm used, and $x_r$ is of a reduced dimension r and represents the vector of the reduced order states. The original states of the system x can be recovered from x, using the following simple algebraic equation $$x(t) \simeq \Phi x_r(t)$$

where x is usually a vector of high dimension n»r, containing the n states obtained from the spatial discretization of the PDE equation, and Φ is a matrix formed by concatenating given vectors called modes or basis vectors of the ROM 506. These modes differ depending on which model reduction method is used. Examples of the model reduction methods include a proper orthogonal decomposition (POD), dynamic mode decomposition (DMD) method, and the like.

However, the solution of the ROM equation 506 can lead to unstable solution (divergent over a finite time support) which is not reproducing the physics of the original PDE models having a viscous term that makes the solutions always stable, i.e. bounded over a bounded time support. For instance, the ODE may lose intrinsic characteristics of actual solutions of the physics-based high dimension model, during the model reduction. To that end, the ODE may lose boundedness of the actual solutions of the physics-based high dimension model in space and time.

Accordingly, some embodiments modify the ROM 506 by adding a closure model 504 representing a difference between the ODE and the PDE. For instance, the closure model 504 captures the lost intrinsic characteristics of the actual solutions of the PDE and acts like a stabilizing factor. Some embodiments allow updating only the closure model 506 to reduce the difference between the ODE and PDE.

For instance, in some embodiments, the ROM 406 can be mathematically represented as:

$$\dot{x}_r = b + Ax_r + x_r^T Bx_r + F(K,x)$$

The function F is the closure model 504, which is added to stabilize the solutions of the ROM model 506. The terms $b + Ax_r + x_r^T Bx_r$ represent the ODE. The term K represents a vector of coefficients that should be tuned to ensure the stability, as well as, the fact that the ROM 506 needs to reproduce the dynamics or solutions of the original PDE model. In some embodiments, the closure model 504 is the linear function of the state of the system 202. In some other embodiments, the closure model 404 may be the nonlinear function of the state of the system 202. In some embodiments, the reinforcement learning (RL)-based data-driven method may be used to compute the closure model 504. Further, the computation of the closure model 504 using the reinforcement learning (RL) is explained in detail with reference to FIGS. 6A-6B.

Figure 6A:
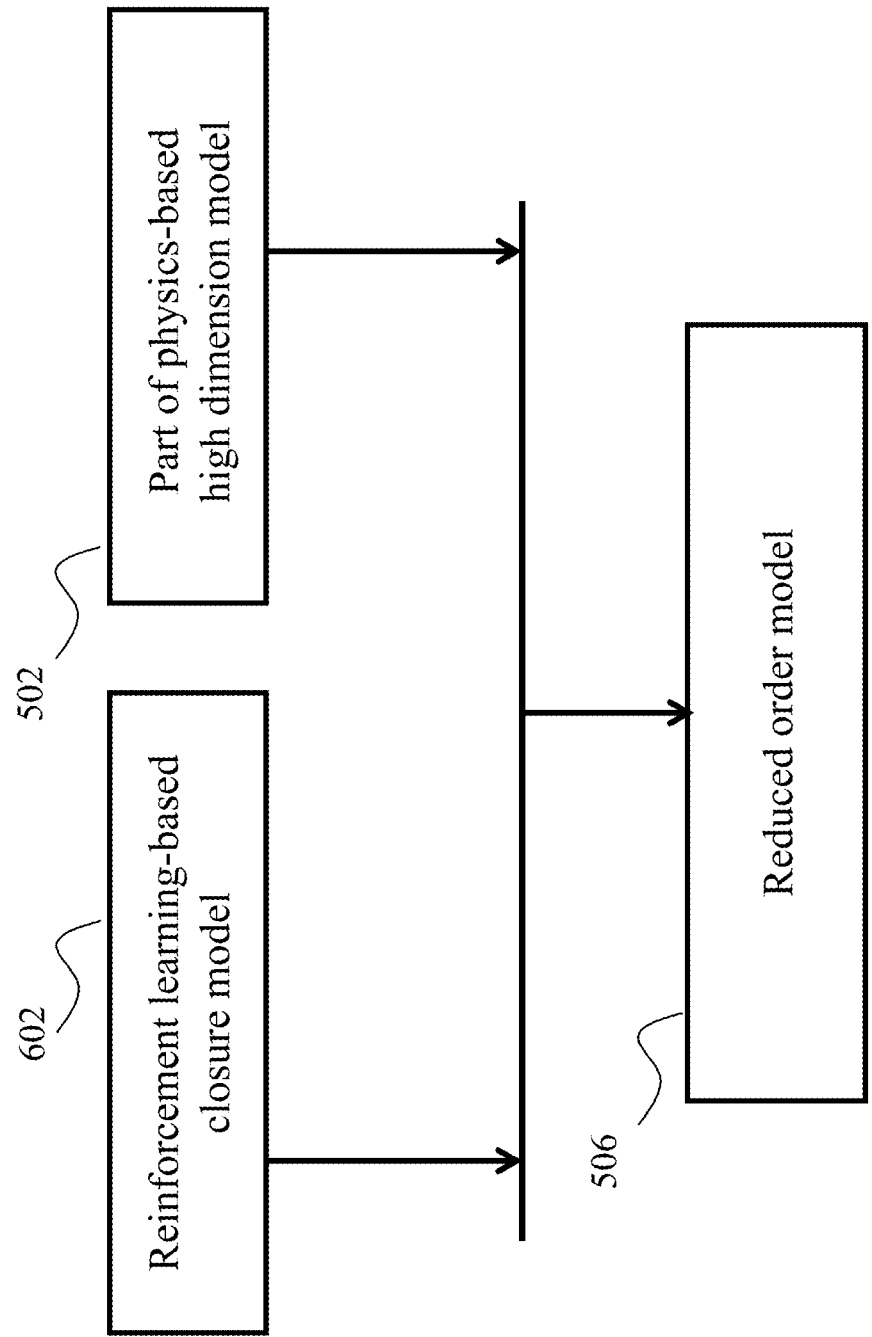
FIG. 6A shows a schematic of the reduced order model based on reinforcement learning (RL), according to some embodiments of the present invention.

FIG. 6A shows a schematic of the reduced order model 506 based on reinforcement learning (RL), according to some embodiments. In some embodiments, the RL-based data-driven method may be used to compute a RL-based closure model 602. Some embodiments are based on recognition that the closure model 502 is iteratively updated with the RL to compute the RL-based closure model 602. The RL-based closure model 602 may be an optimal closure model. Further, the iterative process for updating the closure model 504 is explained in detail with reference to FIG. 6B. Some embodiments are based on realization that the optimum closure model in combination with ODE may form the optimal ROM 506. In some embodiments, the ROM 506 may estimate the actual pattern of behavior the system 202. For instance, the ROM 506 mimics the shape of the received state trajectory.

This invention uses reinforcement learning (RL) to solve the following estimation problem: given a sequence of measurements $\{y_0, \cdots, y_k\}$ 109 from a reference trajectory $\{z_0, \cdots, z_k\}$ of 105 and knowing the ROM 506 defined by $A_r$, $C_r$ and U, we want to estimate the high-dimensional state $z_k$ at current time k. To this effect, we design a reduced-order estimator (ROE) of the form $$\hat{x}_k = A_r x_{k-1} + a_k,$$

$$a_k \sim \pi_\theta(\cdot | y_k, \hat{x}_{k-1}),$$

where $\hat{x}_k$ is an estimate of the reduced-order state $x_k$, and $a_k \in \mathbb{R}^r$ is an action sampled from a stochastic policy $\pi_\theta$ which depends on the current measurement $y_k$ and the previous state estimate $\hat{x}_{k-1}$. The subscript θ denotes the set of parameters that defines the stochastic policy, whose goal is to minimize the mean square error $\mathbb{E}[z_k - \hat{z}_k]$ over a range of reference trajectories and initial reduced-order state estimates. Here, $\hat{z}_k = U\hat{x}_k$ denotes the high-dimensional state estimate reconstructed from $\hat{x}_k$.

A Kalman filter is a special case of such an estimator, for which the action is given by $$a_k = K_k(y_k - C_r A_r \hat{x}_{k-1}),$$

with $K_k \in \mathbb{R}^{r \times p}$ the optimal Kalman gain. Although the Kalman filter is optimal when the state-transition and observation models are known exactly, its performance suffers in the presence of unmodeled dynamics. Such model errors are unavoidable due to the ROM 506 being an inherent approximation of the high-dimensional dynamics 101, which motivates our adoption of the more general form 108. This form retains the dependence of $a_k$ on $y_k$ and $x_{k-1}$ but is more flexible thanks to the nonlinearity of the stochastic policy $\pi_\theta$, which can be trained with deep RL in an offline stage 106. The stochasticity of $\pi_\theta$ forces the RL algorithm to explore different actions during the training process, in order to find eventually an optimal θ* such that $\mathbb{E}[z_k - \hat{z}_k]$ is minimized for various reference trajectories and initial estimates. Some embodiments call the estimator constructed and trained through this process an RL-trained ROE, or RL-ROE for short.

Figure 6B:
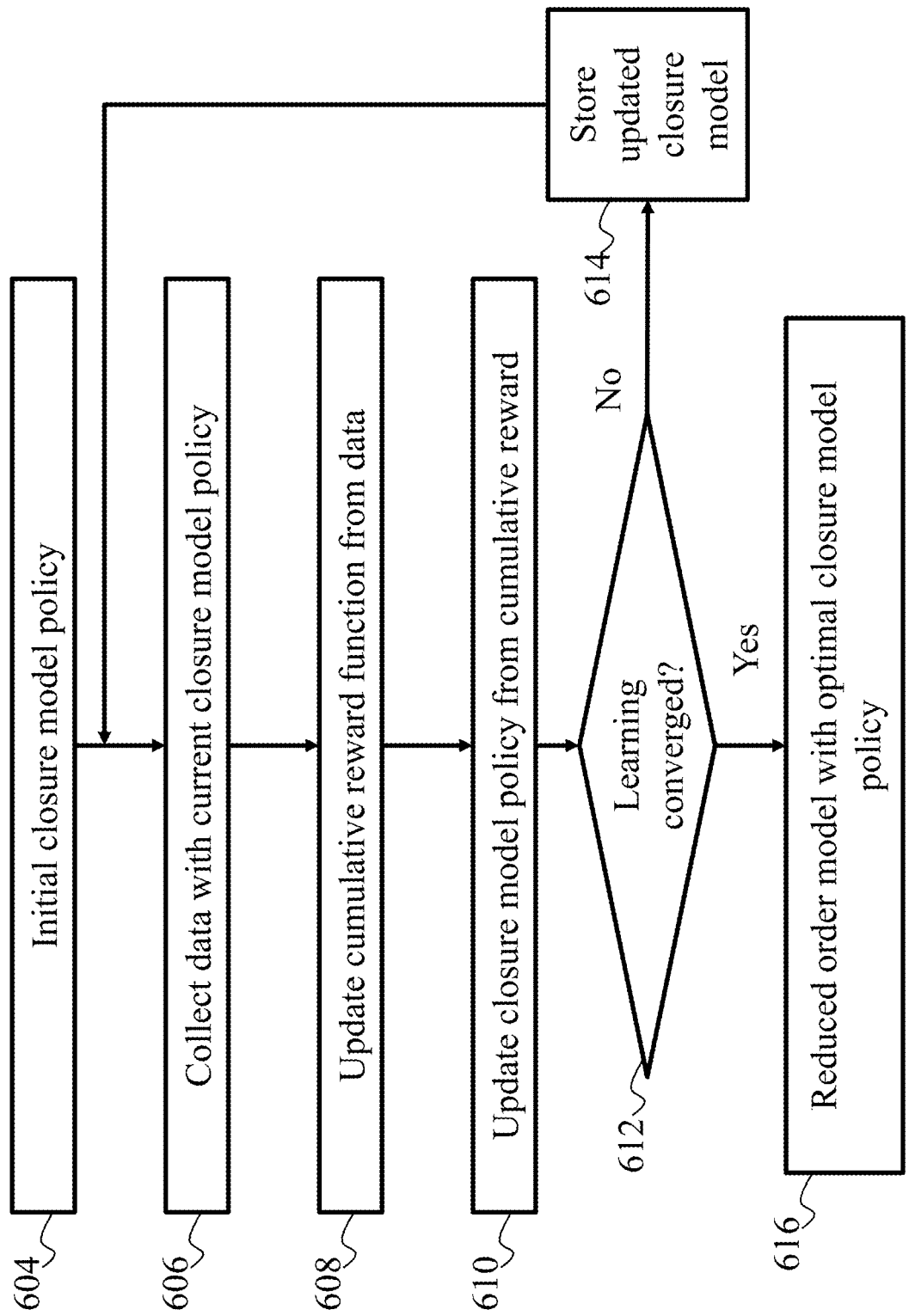
FIG. 6B shows a flowchart of operations for updating a closure model using the RL, according to an embodiment of the present invention.

FIG. 6B shows a flowchart of operations for updating the closure model 602 using the RL, according to an embodiment of the invention. At step 604, the apparatus 1200 may be configured to initialize an initial closure model policy and a learning cumulative reward function associated with the initial closure model policy. The initial closure model policy may be a simple linear closure model policy. The cumulative reward function may be a value function. At step 606, the apparatus 1200 is configured to run the ROM 606 comprising the part of the physics-based high dimension model 502 and the current closure model (for instance, the initial closure model policy) to collect data along a finite time interval. To that end, the apparatus 1200 collects the data representing the pattern of behavior of the dynamics of the system 202. For instance, the pattern of the behavior captures rate of change of the energy of the system 202 over the finite time interval. Some embodiments are based on realization that the pattern of behavior of the dynamics of the system 202 can be represented by the shape of the state trajectory over the finite time interval.

At steps 608, the apparatus 1200 is configured to update the cumulative reward function using the collected data. In some embodiments, the apparatus 1200 updates the cumulative reward function (i.e. the value function) to indicate the difference between the shape of the received state trajectory and the shape of state trajectory estimated using the ROM 506 with the current closure model (for instance, the initialized closure model).

Some embodiments are based on realization that the RL uses a neural network trained to minimize the value function. To that end, at step 610, the apparatus 1200 is configured to update the current closure model policy using the collected data and/or the updated cumulative reward function, such that the value function is minimized.

In some embodiments, the apparatus 1200 is configured to repeat the steps 606, 608, and 610 until a termination condition is met. To that end, at step 612, the apparatus 1200 is configured to determine whether the learning is converged. For instance, the apparatus 1200 determines whether the learning cumulative reward function is below a threshold limit or whether the two consecutive learning cumulative reward functions are within a small threshold limit. If the learning is converged, the apparatus 1200 proceeds with step 616, else the apparatus 1200 proceeds with step 614. At step 614, the apparatus 1200 is configured to replace the closure model with the updated closure model and iterates the updating procedure until the termination condition is met. In some embodiments, the apparatus 1200 iterates the updating procedure until the learning is converged. At step 614, the apparatus 1200 is configured to stop the closure model learning and use the last updated closure model policy as the optimal closure model for the ROM 506.

Figure 7:
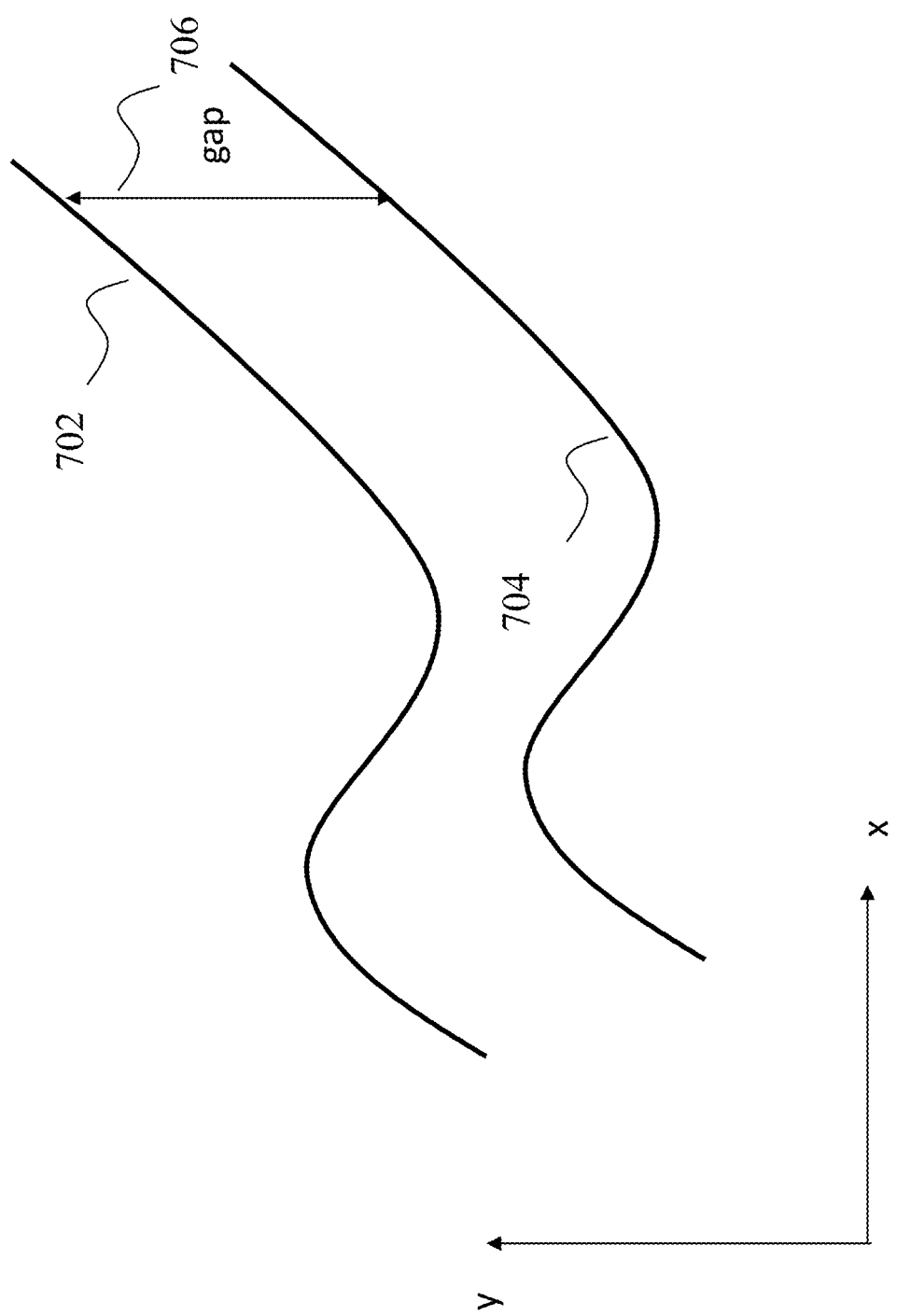
FIG. 7 shows a difference between an actual behavior and an estimated behavior of the system, according to some embodiments of the present invention.

FIG. 7 shows the difference between the actual behavior and the estimated behavior of the system 202, according to some embodiments. In some embodiments, the pattern of the behavior of the system 202 may be represented by 2-dimensional axes, where x-axis corresponds to time and y-axis corresponds to magnitude of energy of the system 202. A wave 702 may represent the actual behavior of the system 202. A wave 704 may represent the estimated behavior of the system 202. Some embodiments are based on recognition that there may exist a quantitative gap 706 between the actual behavior 702 and the estimated behavior 704. For instance, the actual behavior 702 and the estimated behavior 704 may have similar frequencies, but has different amplitudes.

To that end, it is objective of some embodiments to include policy parameters θ in the optimal closure model, such that the gap 706 between the actual behavior 702 and the estimated behavior 704 is reduced. Further, the apparatus 1200 to determine the policy parameters θ for reducing the gap 706 is explained in detail with reference to FIGS. 8A, 8B, 8C.

Figure 8A:
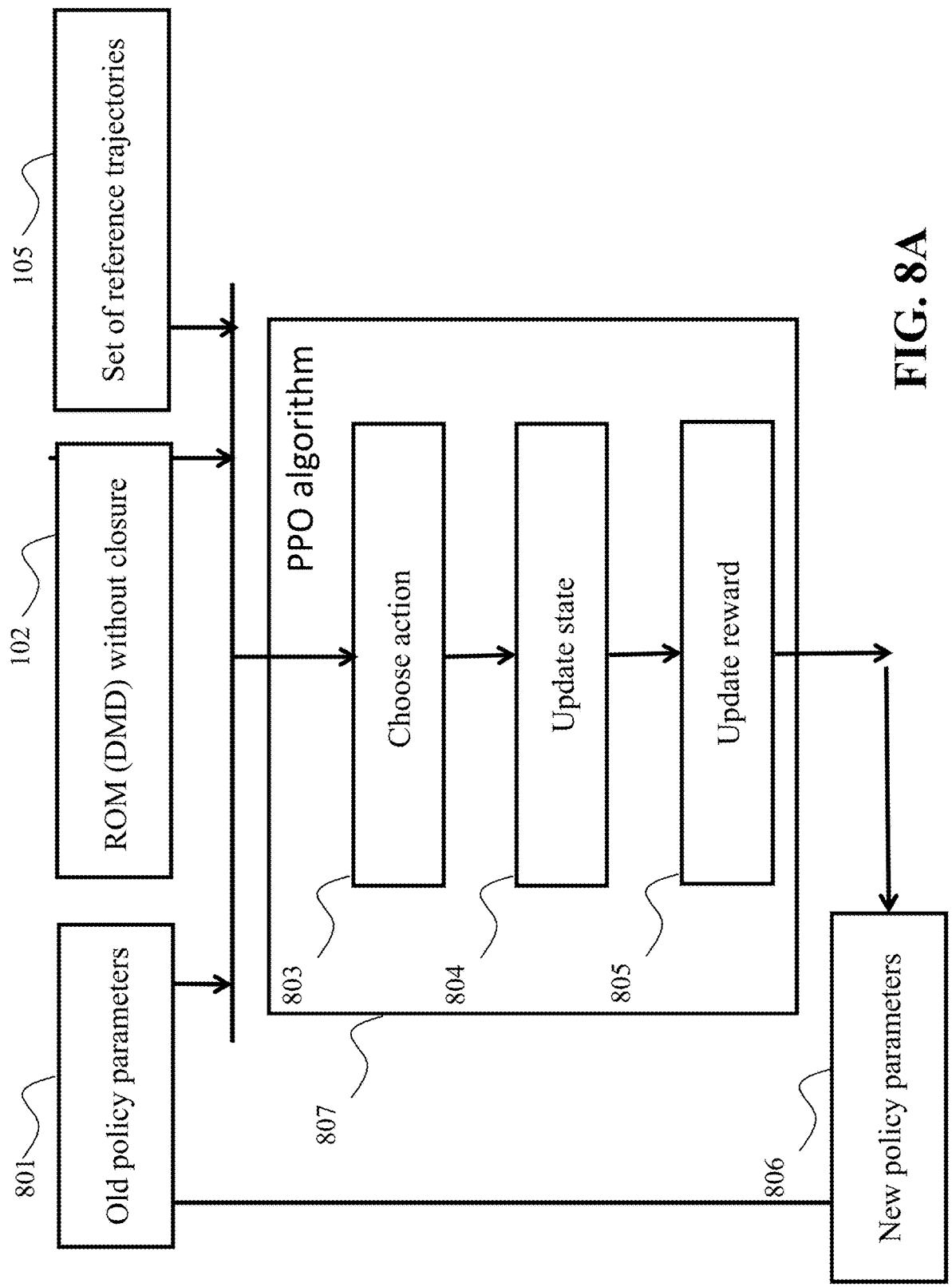
FIGS. 8A, 8B and 8C show a schematic of training algorithm for learning an optimal policy to be used in the closure model, according to an embodiment of the present invention.
Figure 8B:
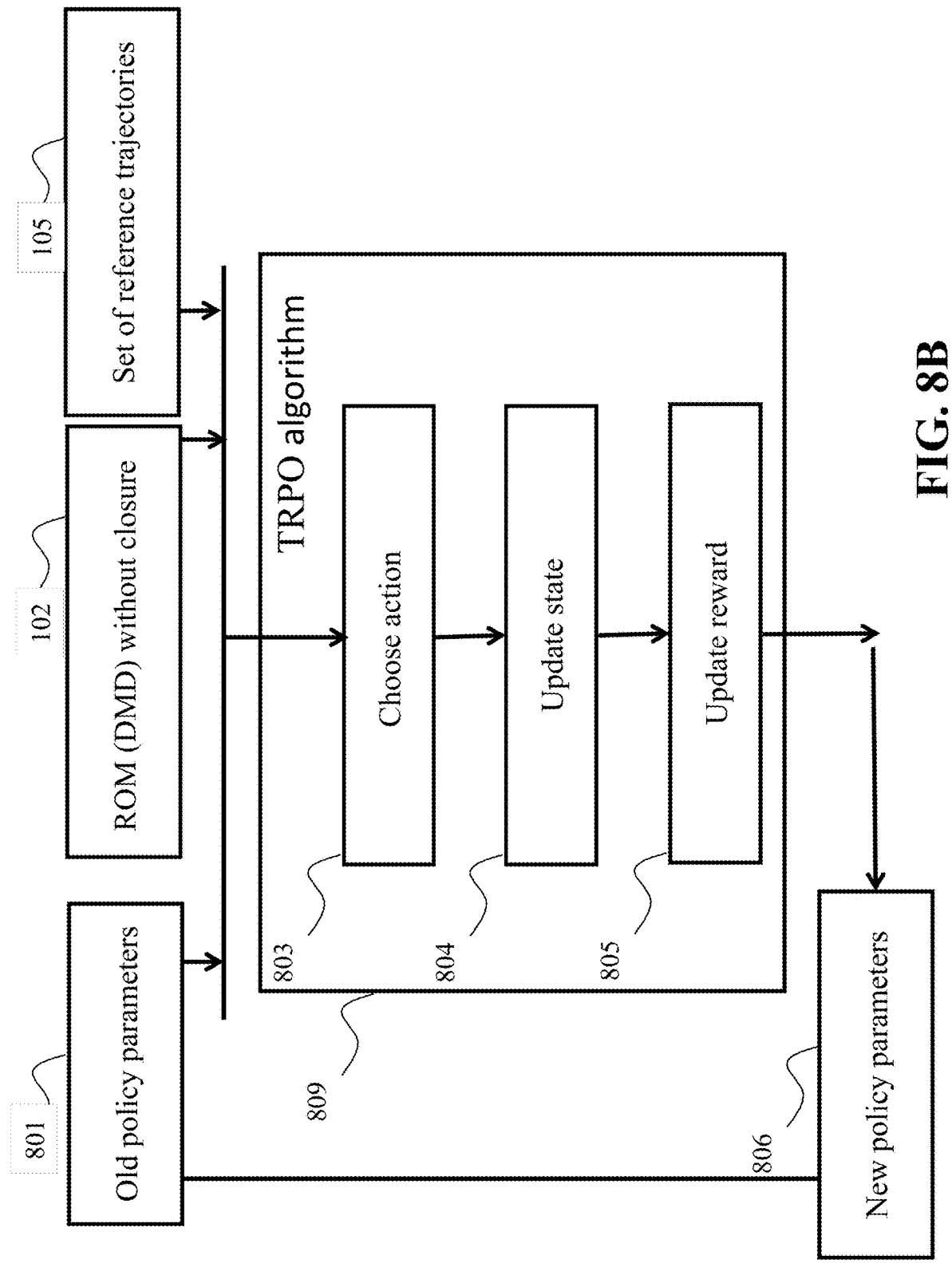
Figure 8C:
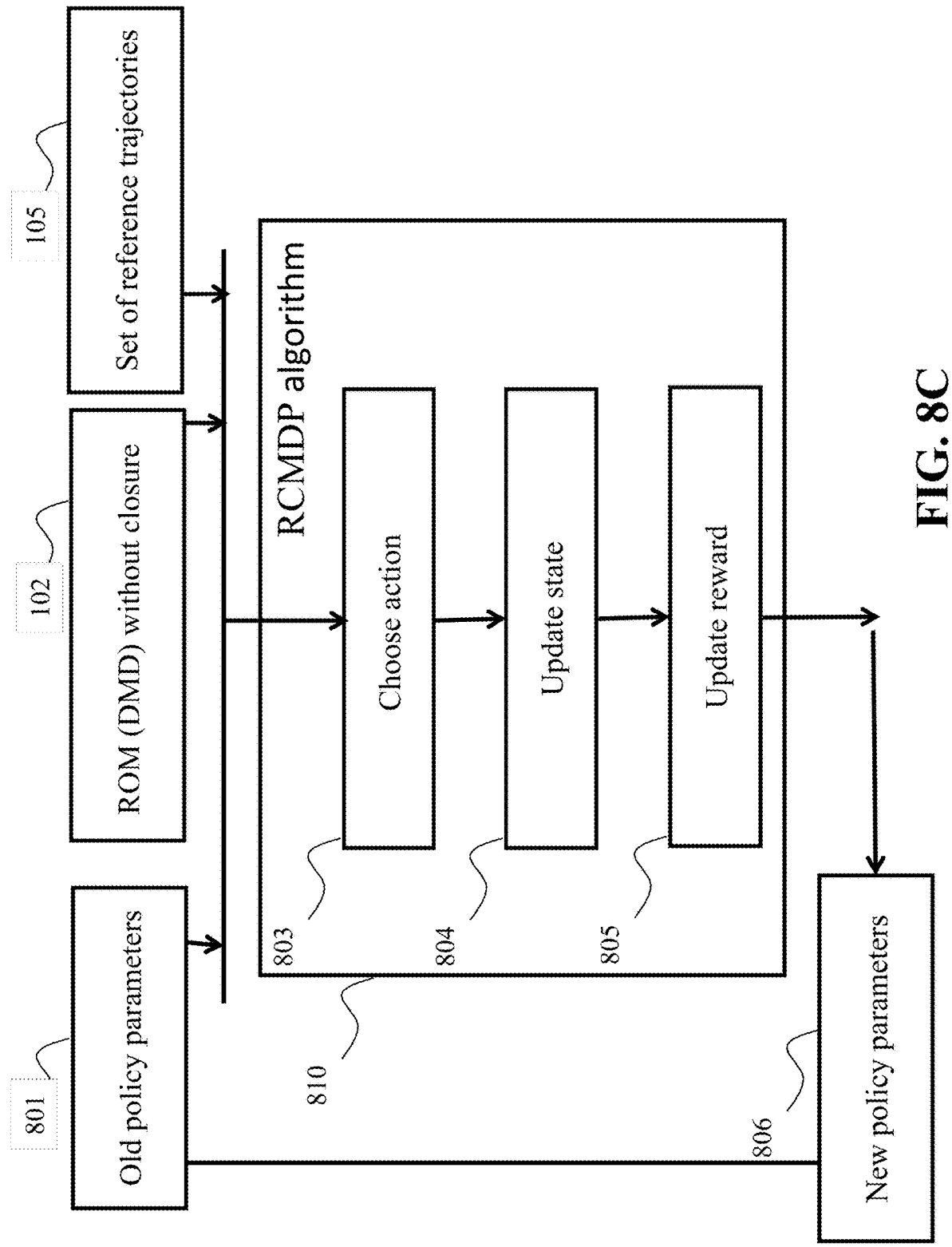

FIGS. 8A-8C show a schematic of training algorithm for tuning the optimal closure model, according to an embodiment of the invention. Some embodiments are based on recognition that the ROM 506 comprising the ODE 502 and the optimal closure model (i.e., the optimal ROM 506) may be useful for a small time-interval. In other words, the optimal ROM 506 forces the behavior of the system 202 to be bounded only for the small time-interval. To that end, it is objective of some embodiments to tune the policy parameters θ (also referred to as coefficients) of the optimal ROM 506 over time.

FIG. 8A describes the offline training process 106 for the policy $\pi_\theta$ in the RL-ROE 103 using FIG. 8A with more details. In order to train $\pi_\theta$ with reinforcement learning, we need to formulate the problem as a stationary Markov decision process (MDP). However, this is no trivial task given that the aim of the policy is to minimize the error between the state estimate $\hat{z}_k = U\hat{x}_k$ and a time-dependent reference state $z_k$. At first sight, such trajectory tracking problem requires a time-dependent reward function and, therefore, a time-varying MDP.

Our invention proposes a trick to translate this time-varying MDP to an equivalent, extended stationary MDP to be able to use off-the-shelf RL algorithms. Our invention shows that the problem can be framed as a stationary IMDP by including $z_k$ into our definition of the MDP's state. Letting $s_k = (z_k, \hat{x}_{k-1}) \in \mathbb{R}^{n+r}$ denote an augmented state at a time k, some embodiments can define an MDP consisting of the tuple $(\mathcal{S}, \mathcal{A}, \mathcal{P}, \mathcal{R})$, where $\mathcal{S} = \mathbb{R}^{n+r}$ is the augmented state space, $\mathcal{A} \subset \mathbb{R}^r$ is the action space, $P(\cdot|s_k, a_k)$ is a transition probability, and $\mathcal{R}(s_k, a_k, s_{k+1})$ is a reward function. At each time step $k$, the agent selects an action $a_k \in \mathcal{A}$ according to the policy $\pi_\theta$ parametrized by old policy parameters 801, which can be expressed $$a_k \sim \pi_\theta(\cdot|o_k),$$

where $o_k = (y_k, \hat{x}_{k-1}) = (Cz_k, \hat{x}_{k-1})$ is a partial observation of the current state $s_k$. Such action is denoted in choose-action step 803 and for estimation this action corresponds to the behavior of the closure model and not the actuation of the HVAC system. The state $s_{k+1} = (z_{k+1}, \hat{x}_k)$ at the next time step is then obtained using update-state step 804 as $$s_{k+1} = (f(z_k), A, \hat{x}_{k-1} + a_k),$$

which defines the transition model $s_{k+1} \sim P(\cdot|s_k, a_k)$. Finally, the agent receives the reward in update-reword step 805 as $$r_k = \mathcal{R}(s_k, a_k, s_{k+1}) = -(z_k - U\hat{x}_k)^T Q(z_k - U\hat{x}_k) - a_k^T R a_k,$$

where $Q \in \mathbb{R}^{n \times n}$ and $R \in \mathbb{R}^{r \times r}$ semidefinite and positive definite matrices, respectively. The first term in the reward function R penalizes the difference between the high-dimensional state estimate $\hat{z}_k = U\hat{x}_k$ and the reference $z_k$, which is only partially observed by the agent. The second term favors smaller values for the action $a_k$; such regularization leads to more robust estimation performance in the presence of noise during online deployment of the RL-ROE, as we will see later.

Our invention, by combining of $z_k$ into $s_k$, makes the reward function such that it has no explicit time dependence and the MDP is therefore stationary.

The goal of the RL training process is then to find the new optimal policy parameters in step 806

$$\theta^* = \underset{\theta}{\mathrm{argmax}}\; \underset{\tau \sim \pi_\theta}{\mathbb{E}}\, [R(\tau)],$$

where the expectation is over trajectories $\tau=(s_1, a_1, s_2, a_2, \ldots)$, and $R(T)$ is the finite-horizon undiscounted return $$R(T)=\Sigma_{k=1}^{K} r_k,$$

with the integer K denoting the length of each training trajectory. The environment is initialized at time k=0 according to the distributions $$z_0 \sim p_{z_0}(\cdot),$$

$$\hat{x}_0 \sim p_{\hat{x}_0}(\cdot),$$

from which the augmented state $s_1=(z_1, \hat{x}_0)=(f(z_0), \hat{x}_0)$ follows immediately. Thus, $s_i$ constitutes the start of the trajectory of agent-environment interactions.

To find the optimal policy parameters $\theta^*$ to be used in 806, some embodiments employ the Proximal Policy Optimization (PPO) algorithm 807, which belongs to the class of policy gradient methods. PPO alternates between sampling data by computing a set of trajectories $\{\tau_1, \tau_2, \tau_3, \ldots\}$ using the most recent version of the policy, and updating the policy parameters θ 806 in a way that increases the probability of actions that led to higher rewards during the sampling phase. The policy $\pi_\theta$ encodes a diagonal Gaussian distribution described by a neural network that maps from observation to mean action, $\mu_{\theta'}(o_k)$, together with a vector of standard deviations σ, so that θ={θ', σ}.

Some embodiments employ Trust Region Policy Optimization (TRPO) algorithm 809 instead of PPO to find the optimal policy parameters θ* to be used in step 806. FIG. 8B shows such policy gradient method. The basic principle uses gradient ascent to follow policies with the steepest increase in rewards. However, the first-order optimizer is not very accurate for curved areas. Some embodiments utilize TRPO in addressing this issue. The power of TRPO, PPO, and natural policy gradient builds on the concept of guaranteed monotonic improvement. Theoretically, the policy update in each TRPO iteration creates a better policy within a trusted region. With such a guarantee inside the trust region, we can locate the optimal policy iteratively.

FIG. 8C shows a policy gradient that uses robust constrained-MDPs (RCMDP) 810 to find the optimal policy parameters θ* to be used in 806. Some embodiments focus on the problem of robustifying reinforcement learning (RL) algorithms with respect to model uncertainties. In such cases, one merges the theory of constrained Markov decision process (CMDP), with the theory of robust Markov decision process (RMDP), leading to a formulation of robust constrained-MDPs (RCMDP). This formulation leads to design RL algorithms that are robust in performance, and provides constraint satisfaction guarantees, with respect to uncertainties in the system's states transition probabilities. The need for RCMPDs is important for real-life applications of RL. RCMDP uses a Lagrangian formulation of the optimal problem, leading to a robust-constrained policy gradient RL algorithm.

Figure 9A:
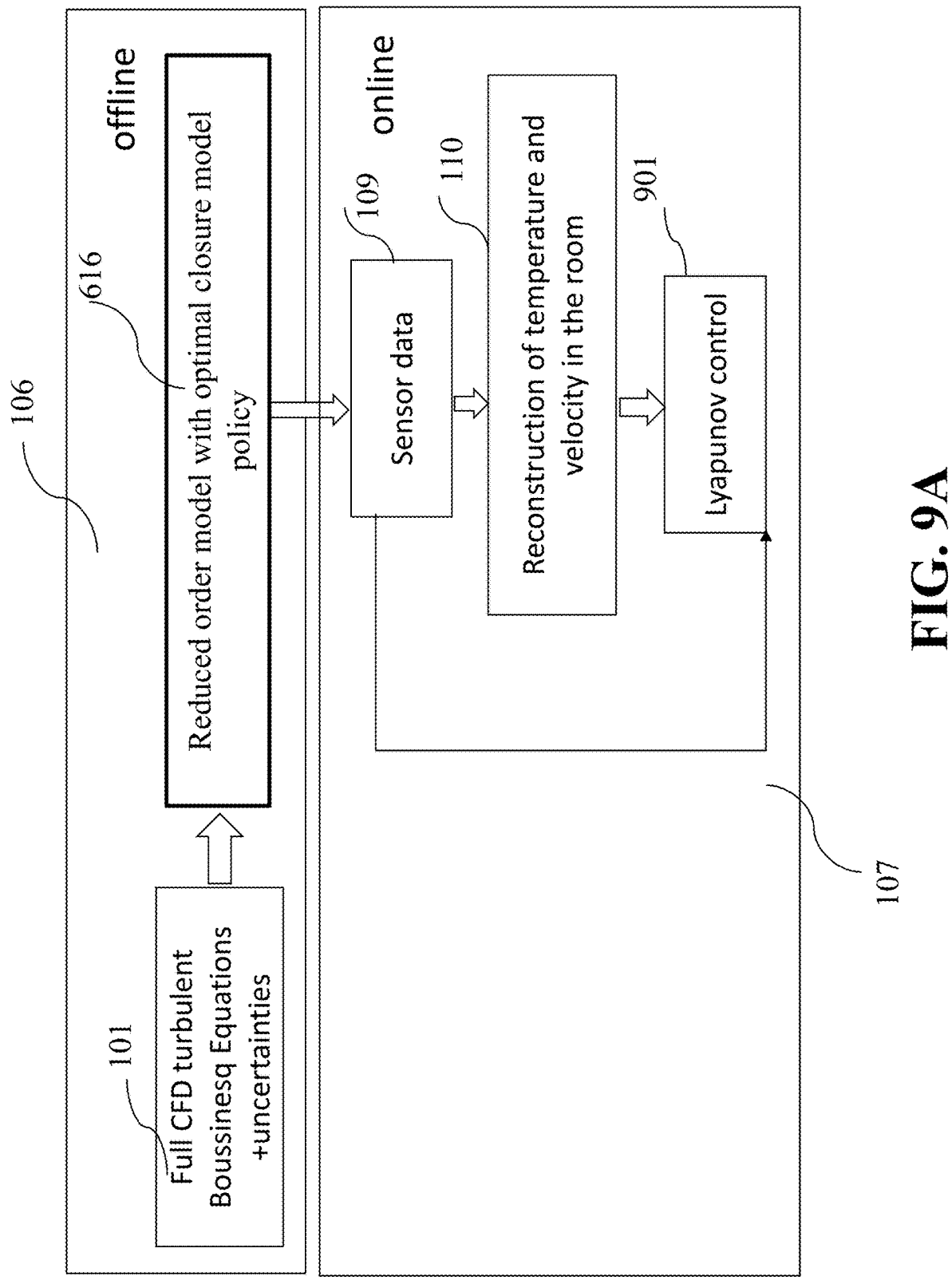
FIGS. 9A, 9B and 9C show a schematic of control algorithm based on robust reduced order model, according to some embodiments of the present invention.
Figure 9B:
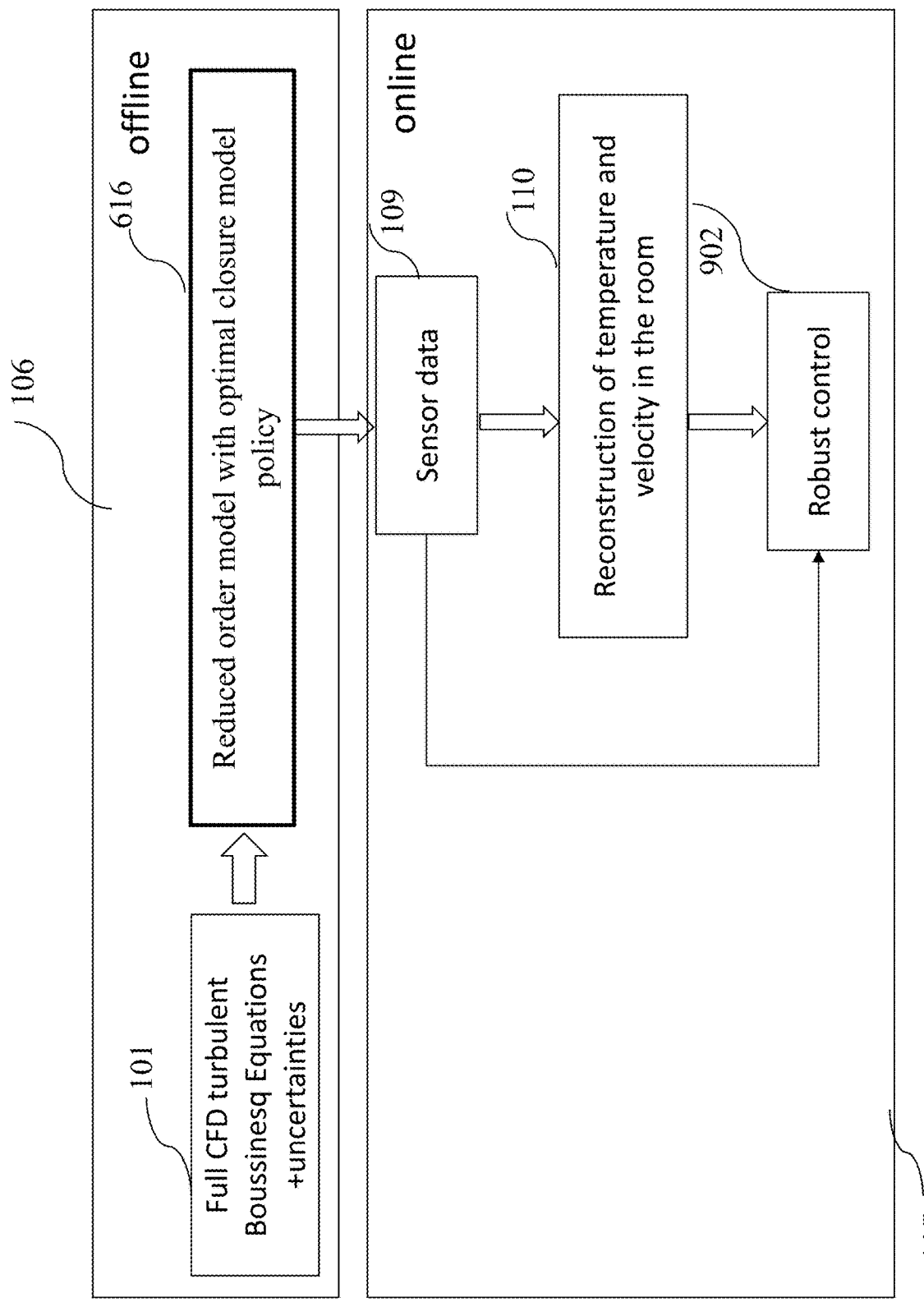
Figure 9C:
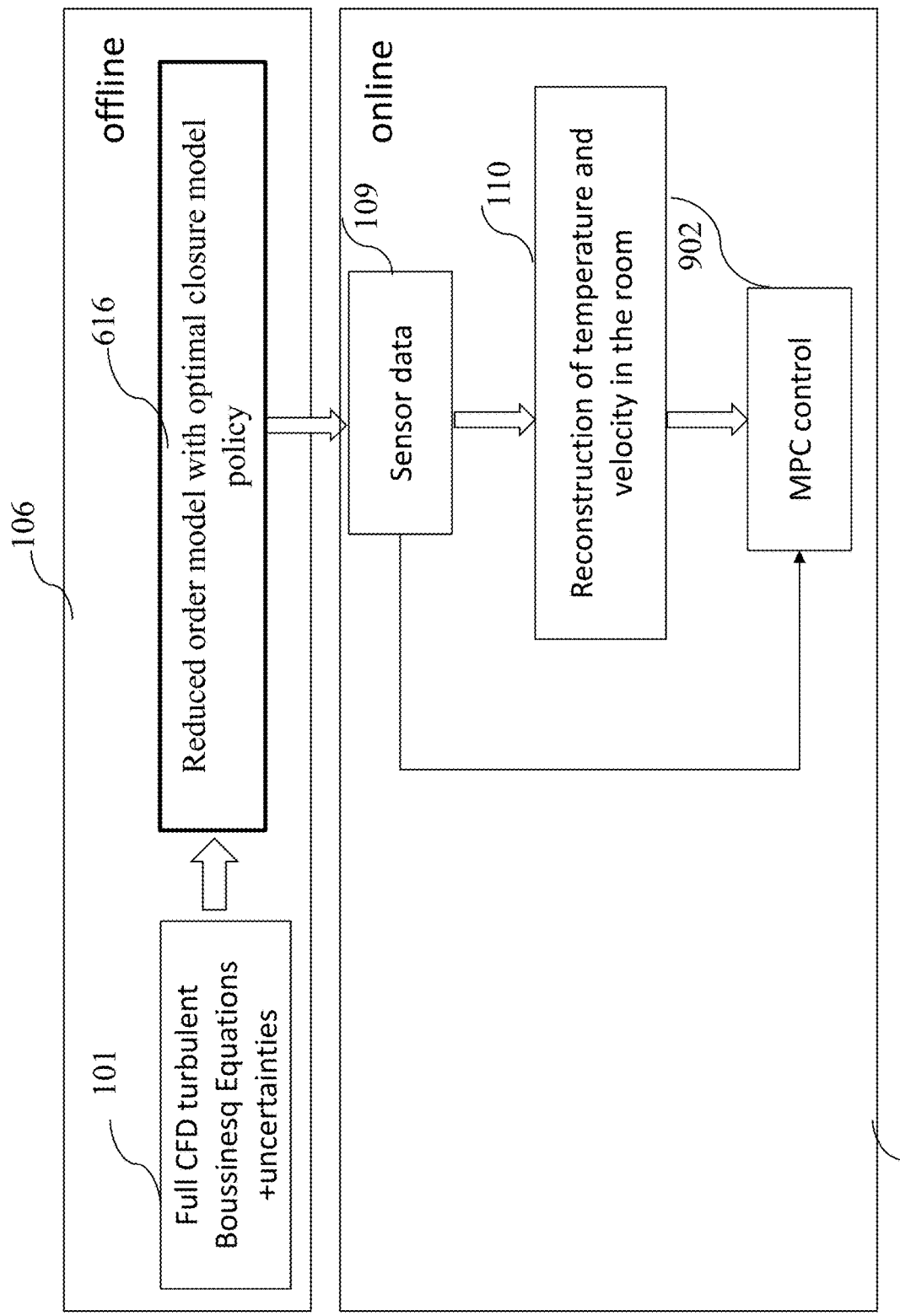

FIGS. 9A-9C show a schematic of control algorithm to use robust ROM 616 trained in offline stage 106 to be used for online control of system 202, according to an embodiment of the invention. Sensor data 109 are used for data assimilation and are incorporated with RL-based closure model to update ROM. Once the model is available it can be used for online control. Example of control u is the actuation related to HVAC performance such as compressor speed, fan speed, yaw angle of blades, temperature and velocity at the outlet of HVAC, etc.

The offline training phase 106 described in FIGS. 8A-8C (to find the optimal parameters θ*) requires knowledge of the high-dimensional state $z_k$ from several reference trajectories of 105. During online deployment, however, the RL-ROE 616 only relies on measurements $y_k$, since the trained policy $\pi_{\theta^*}$ is conditioned on $y_k$ and the previous reduced state estimate $\hat{x}_{k-1}$. In essence, we are seeking a Kalman-type observer, which in some embodiments is also known as an infinite impulse response filter (IIR). These observers are to be contrasted with the finite impulse filters (FIR). Indeed, the later are well known to be based on a mapping between n previous samples of input/output and the desired observed state at the current instant, and lead to exact convergence in finite-time, in the noiseless setting. On the other hand, the IIR observer is well known to be an explicit function of the last measurement of the output/input only and leads to an average finite-time performance, i.e., maximum likelihood estimate over [0, K].

FIG. 9A shows a Lyapunov-based control to be used in combination of robust ROM 616. Since such model is much less computationally demanding than the full order model of 101, online control 107 is feasible. In control theory, a control-Lyapunov function is an extension of the idea of Lyapunov function V(x) to systems with control inputs. The ordinary Lyapunov function is used to test whether a dynamical system is stable. That is, whether the system starting in a state x≠0 in some domain D will remain in D, or for asymptotic stability will eventually return to x=0. The control-Lyapunov function is used to test whether a system is stabilizable, that is whether for any state x there exists a control u(x, t) such that the system can be brought to the zero state by applying the control u.

FIG. 9B shows a robust control to be used in combination of robust ROM 616. In control theory, robust control is an approach to controller design that explicitly deals with uncertainty. Robust control methods are designed to function properly provided that uncertain parameters or disturbances are found within some (typically compact) set. Robust methods aim to achieve robust performance and/or stability in the presence of bounded modelling errors. In contrast with an adaptive control policy, a robust control policy is static, rather than adapting to measurements of variations, the controller is designed to work assuming that certain variables will be unknown but bounded. The controller may perform some computation based on one or more sensor measurements in order to calculate values for one or more actuators of the vapor compression cycle, such that a desired performance objective is satisfied. In some cases, a vapor compression cycle (system) of the HVAC system is connected to a controller or optimizer that adjusts actuators, such as a compressor speed, valve settings, or fan speeds, in order to achieve a desirable operating performance. The controller may obtain information about a vapor compression cycle via sensors that may be installed on or near the vapor compression cycle in order to measure states of the vapor compression cycle or its environment, including some thermofluid property variables. Examples of such sensors are temperature sensors or pressure sensors. When actuators of the HVAC system received, via an output interface, the control commands including instructions, the control commands control operations of the actuators of HVAC system vapor compression cycles that have variable-position actuators, such as variable speed compressors or fans.

A robust controller 902 can account for uncertainties that are not addressed with RL-ROE 616 using a variety of solutions. In some embodiments, a high gain feedback control is used such that effect of any parameter variations will be negligible. From the closed-loop transfer function perspective, high open-loop gain leads to substantial disturbance rejection in the face of system parameter uncertainty. In some other embodiments, sliding mode control is used for robust control 902. A sliding mode control (SMC) changes the dynamics given by 616 by applying a discontinuous control signal (or more rigorously, a set-valued control signal) that forces the system to "slide" along a cross-section of the system's normal behavior. SMC is a special class of nonlinear control system that is less sensitive to variations and disturbances in plant parameters of 616.

FIG. 9C shows a MPC control to be used in combination of robust ROM 616. Model predictive control (MPC) is an advanced method of process control that is used to control a process while satisfying a set of constraints. Model predictive controllers rely on dynamic models of the process, which in our case can be given by robust ROM 616. The main advantage of MPC is the fact that it allows the current timeslot to be optimized, while keeping future timeslots in account. This is achieved by optimizing a finite time-horizon, but only implementing the current timeslot and then optimizing again, repeatedly, thus differing from a linear-quadratic regulator (LQR). Also, MPC has the ability to anticipate future events and can take control actions accordingly. PID controllers do not have this predictive ability. MPC is nearly universally implemented as a digital control, although there is research into achieving faster response times with specially designed analog circuitry.

MPC 902 is configured to determine the optimal temperature and velocity setpoints designed for thermal comfort by generating a cost function that accounts for a cost operating the HVAC equipment during each of a plurality of time steps in an optimization period using a predictive model (that is given by RL-ROE 616) to predict the temperature, velocity, and humidity of the building zone during each of the plurality of time steps and optimizing the cost function subject to a constraint on the predicted temperature, velocity, and humidity of the building zone to determine optimal temperature and velocity setpoints for each of the plurality of time steps.

Figure 10:
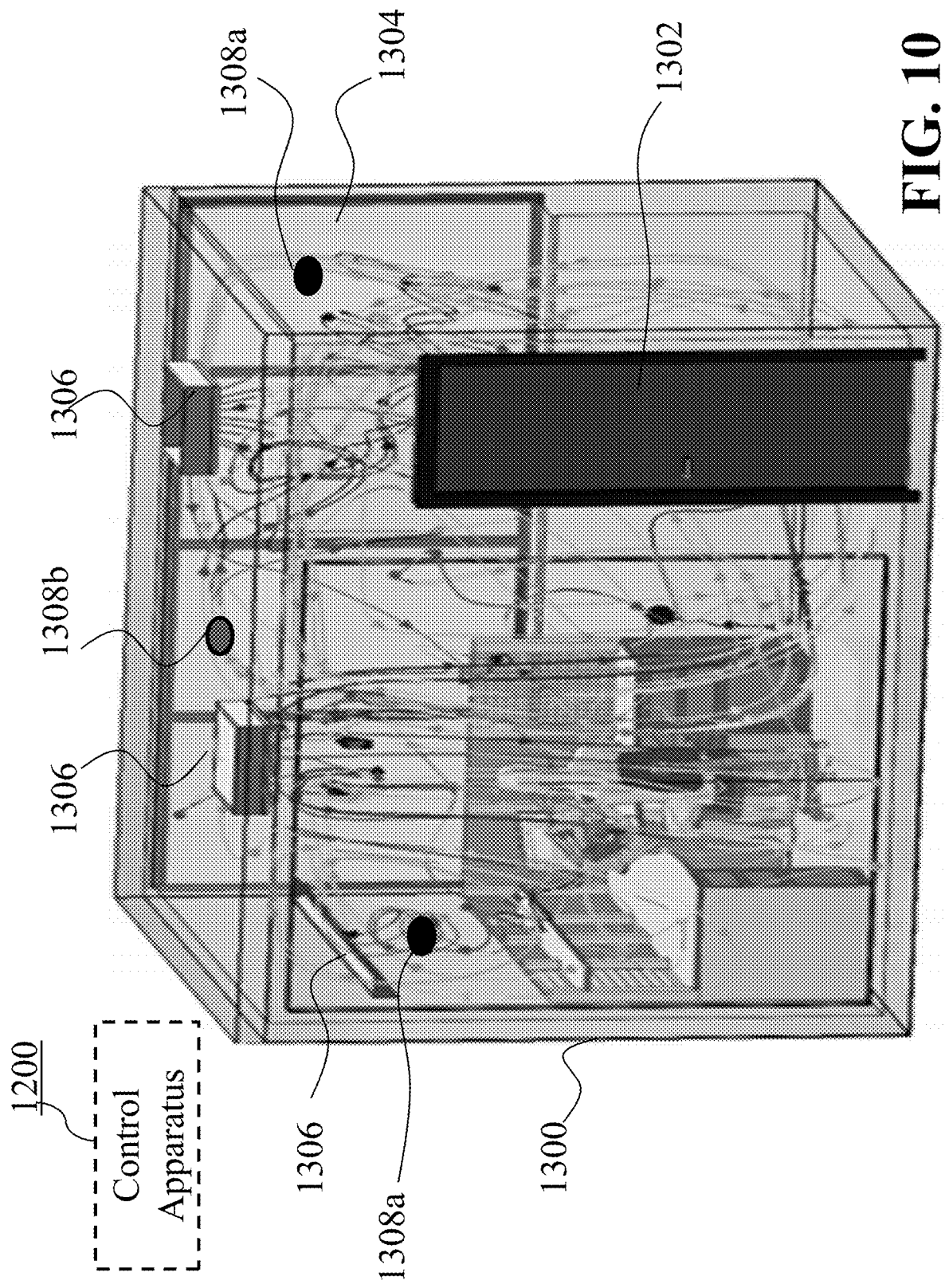
FIG. 10 shows an exemplary real-time implementation of the apparatus for controlling the system, wherein the system is an air-conditioning system, according to embodiments of the present invention.

FIG. 10 shows an exemplary real-time implementation of the control apparatus 1200 for controlling the system 202, wherein the system 202 is an air-conditioning system (hereinafter also referred to as air-conditioning system 202). In this example, a room 1300 has a door 1302 and at least one window 1304. The temperature and the airflow of the room 1300 are controlled by the apparatus 1200 via the air-conditioning system 202 through ventilation units 1306. A set of sensors 1308 is arranged in the room 1300, such as at least one airflow sensor 1308a for measuring velocity of the air flow at a given point in the room 1300, and at least one temperature sensor 1308 b for measuring the room temperature. Other type of setting can be considered, for example a room with multiple HVAC units, or a house with multiple rooms.

Some embodiments are based on recognition that the air-conditioning system 202 can be described by the physics-based model called the Boussinesq equation, as exemplary illustrated in FIG. 4. However, the Boussinesq equation contains infinite dimensions to resolve the Boussinesq equation for controlling the air-conditioning system 202. To that end, the model comprising the ODE 502 and the updated closure model with the updated gain is formulated as explained in detail description of FIGS. 1-9. The model reproduces the dynamics (for instance, an airflow dynamics) of the air-conditioning system 202 in an optimal manner. Further, in some embodiments, the model of the air flow dynamics connects the values of the air flow (for instance, the velocity of the air flow) and the temperature of the air conditioned room 1300 during the operation of the air-conditioning system 202. To that end, the apparatus 11200 optimally controls the air-conditioning system 202 to generate the airflow in a conditioned manner.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Individual embodiments above are described as a process which is depicted as a flowchart, a flow diagram, a data flow diagram, a structure diagram, or a block diagram. Although a flowchart shows the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The invention claimed is:

1. A computer-implemented method using a reinforcement learning trained reduced order estimator (RL-trained ROE) and a closure model for controlling a heating, ventilation, and air conditioning (HVAC) system including actuators, wherein the method uses a processor coupled with a memory storing instructions implementing the method, wherein the instructions, when executed by the processor, carry out at steps of the method, comprising:
  acquiring, via an input interface, setpoints of the HVAC system from a user input and measurement data from sensors arranged in the HVAC system;
  computing a high-dimensional state estimate using the measurement data and an estimate of reduced-order state from the RL-trained ROE;
  determining a controller with respect to the setpoints by using the RL-trained ROE;
  generating control commands corresponding to the computed high-dimensional state estimate, based on the controller; and
  transmitting, via an output interface, the control commands including instructions that control operations of the actuators of HVAC system.

2. The method of claim 1, wherein the controller is designed using a model predictive control.

3. The method of claim 1, wherein the controller is designed using Lyapunov design.

4. The method of claim 1, wherein the controller is designed using robust control that takes into account model uncertainties in the RL-trained ROE.

5. The method of claim 1, wherein the RL-trained ROE controller is trained using Proximal Policy Optimization (PPO) algorithm.

6. The method of claim 1, wherein the RL-trained ROE is trained using Trust Region Policy Optimization (TRPO) algorithm.

7. The method of claim 1, wherein the RL-trained ROE is trained using Robust Constrained Markov Decision Process (RCMDP) algorithm.

8. The method of claim 1, wherein the RL-trained ROE is trained using time-varying non-stationary MDP.

9. An apparatus for controlling a heating, ventilation, and air conditioning (HVAC) system including actuators, comprising:
  an input interface configured to acquire setpoints of the HVAC system from a user input and measurement data from sensors arranged in the HVAC system;
  at least one memory configured to store instructions implementing a computer-implemented method; and
  at least one processor coupled with the at least one memory, wherein the instructions, when executed by the at least one processor, carry out at steps of the computer-implemented method, comprising:
    computing a high-dimensional state estimate using the measurement data and an estimate of reduced-order state from the RL-trained ROE;
    determining a controller with respect to the setpoints by using the RL-trained ROE; and
    generating control commands corresponding to the computed high-dimensional state estimate, based on the controller; and
  an output interrace configured to transmit the control commands including control instructions that control the actuators operating the HVAC system.

10. The apparatus of claim 9, wherein the controller is designed using optimal control.

11. The apparatus of claim 9, wherein the controller is designed using Lyapunov design.

12. The apparatus of claim 9, wherein the controller is designed using robust control.

13. The apparatus of claim 9, wherein the RL-trained ROE is trained using Proximal Policy Optimization (PPO) algorithm.

14. The apparatus of claim 9, wherein the RL-trained ROE is trained using Trust Region Policy Optimization (TRPO) algorithm.

15. The apparatus of claim 9, wherein the RL-trained ROE is trained using Robust Constrained Markov Decision Process (RCMDP) algorithm.

16. The apparatus of claim 9, wherein the RL-trained ROE is trained using time-varying non-stationary MDP.

* * * * *